(12) United States Patent  
Smith et al.

(10) Patent No.: US 11,362,908 B2  
(45) Date of Patent: *Jun. 14, 2022

(54) SYSTEMS AND METHODS FOR COMMUNICATION FLOW MODELING

(71) Applicant: OPEN TEXT SA ULC, Halifax (CA)

(72) Inventors: Robert Smith, Gothenburg (SE); Christian Askland, Gothenburg (SE); Philip Gyuling, Gothenburg (SE); Christian Wessman, Gothenburg (SE); Dennis Reil, Oldenburg (DE)

(73) Assignee: OPEN TEXT SA ULC, Halifax (CA)

( * ) Notice: Subject to any disclaimer, the term of this patent is extended or adjusted under 35 U.S.C. 154(b) by 0 days.

This patent is subject to a terminal disclaimer.

(21) Appl. No.: 17/147,314

(22) Filed: Jan. 12, 2021

(65) Prior Publication Data

US 2021/0135953 A1    May 6, 2021

Related U.S. Application Data

(63) Continuation of application No. 16/451,309, filed on Jun. 25, 2019, now Pat. No. 10,904,102.

(Continued)

(51) Int. Cl.
*H04L 41/18* (2022.01)
*G06F 16/958* (2019.01)
(Continued)

(52) U.S. Cl.
CPC ............ *H04L 41/18* (2013.01); *G06F 16/958* (2019.01); *H04L 41/0253* (2013.01); *H04L 67/02* (2013.01)

(58) Field of Classification Search
CPC ..... H04L 41/00–41/0253; H04L 41/14–41/26; H04L 67/00–67/025; G06F 16/9538–16/958
See application file for complete search history.

(56) References Cited

U.S. PATENT DOCUMENTS

| | | |
|---|---|---|
| 5,181,162 A | 1/1993 | Smith et al. |
| 6,338,074 B1 | 1/2002 | Poindexter et al. |

(Continued)

OTHER PUBLICATIONS

Notice of Allowance issued for U.S. Appl. No. 16/451,309, dated Sep. 25, 2020, 11 pages.
International Search Report and Written Opinion for International Patent Application No. PCT/IB2019/055367, dated Oct. 28, 2019, 5 pages.

(Continued)

*Primary Examiner* — Clayton R Williams
(74) *Attorney, Agent, or Firm* — Sprinkle IP Law Group

(57) ABSTRACT

Disclosed communication flow modeling solution is significantly streamlined in a user friendly way to shield users from the technical complexities usually required. At design time, an orchestration flow modeling application receives user instruction to open or create a communication flow modeling project. Per configuration specific to an enterprise associated with the user, a custom drag-and-drop communication flow modeling environment with a canvas and modeling entities is provided. Responsive to the user dragging and dropping a set of modeling entities from the menu onto the communication flow modeling canvas and drawing connections between them, the orchestration flow modeling application logically connects the modeling entities to form a valid communication flow and stores it in a database. The communication flow undergoes an approval process. Once approved, it is activated for execution by an orchestration server. The orchestration server automatically orchestrates services needed by the communication flow at runtime without user programming.

20 Claims, 14 Drawing Sheets

Related U.S. Application Data

(60) Provisional application No. 62/694,185, filed on Jul. 5, 2018.

(51) Int. Cl.
  *H04L 67/02* (2022.01)
  *H04L 41/0253* (2022.01)

(56) References Cited

U.S. PATENT DOCUMENTS

| | | |
|---|---|---|
| 10,904,102 B2 | 1/2021 | Smith et al. |
| 2005/0209990 A1 | 9/2005 | Ordille et al. |
| 2006/0271390 A1 | 11/2006 | Rich et al. |
| 2007/0083425 A1 | 4/2007 | Cousineau et al. |
| 2007/0233555 A1 | 10/2007 | Fourrage |
| 2008/0319813 A1* | 12/2008 | du Preez ............... G06Q 10/06 705/7.27 |
| 2012/0191546 A1* | 7/2012 | Phelan ............... G06Q 10/107 705/14.67 |
| 2015/0193808 A1 | 7/2015 | Wade |
| 2017/0148227 A1* | 5/2017 | Alsaffar ............... G06T 11/60 |
| 2017/0257486 A1 | 9/2017 | Smith, II et al. |
| 2017/0323349 A1* | 11/2017 | Blaylock ............ G06Q 30/0271 |
| 2017/0344526 A1 | 11/2017 | Smith et al. |
| 2017/0344547 A1 | 11/2017 | Smith et al. |
| 2017/0346828 A1 | 11/2017 | Lorensson et al. |
| 2020/0014604 A1 | 1/2020 | Smith et al. |

OTHER PUBLICATIONS

Al-Fedaghi, S. et al., "Conceptual Model for Communication", International Journal of Computer Science and Information Security, vol. 6, No. 2 (2009), pp. 29-41.

Office Action issued for U.S. Appl. No. 16/451,309, dated Jun. 19, 2020, 11 pages.

Notice of Allowance issued for U.S. Appl. No. 16/451,309, dated Sept. 25, 2020, 11 pages.

International Preliminary Report on Patentability (IPRP) issued for International Application No. PCT/IB2019/055367, dated Jan. 5, 20219, 6 pages.

* cited by examiner

SYSTEMS AND METHODS FOR COMMUNICATION FLOW MODELING

CROSS-REFERENCE TO RELATED APPLICATIONS

This application is a continuation of, and claims a benefit of priority under 35 U.S.C. § 120 from, U.S. patent application Ser. No. 16/451,309, filed Jun. 25, 2019, issued as U.S. Pat. No. 10,904,102, entitled "SYSTEMS AND METHODS FOR COMMUNICATION FLOW MODELING," which claims a benefit of priority under 35 U.S.C. § 119(e) from U.S. Provisional Application No. 62/694,185, filed Jul. 5, 2018, entitled "SYSTEMS AND METHODS FOR COMMUNICATION FLOW MODELING," the entire contents of which are hereby expressly incorporated by reference for all purposes.

TECHNICAL FIELD

This disclosure relates generally to customer communications management. More particularly, this disclosure relates to communication flow modeling systems, methods, and computer program products for customer communications management.

BACKGROUND OF THE RELATED ART

Customer communications management (CCM) refers to a convergent set of Information Technology (IT) components that together provide enterprises with the ability to manage and advance the way that they communicate with their customers. CCM was used in the print industry for complex and yet personalized document generation in high volumes (e.g., individualized billing invoices for an enterprise's customers, etc.). CCM has since evolved to include a variety of digital communication channels such as email or messaging protocols such as SMS, in addition to print/mail.

SUMMARY OF THE DISCLOSURE

Today, enterprises can utilize CCM technologies to communicate with their customers over multiple communication channels, such as print/mail, email, web portals, short message service (SMS), and fax, across a wide range of media including printed documents, email, web pages, text messages, mobile applications, etc. (collectively referred to herein as "communications"). Example types of communications can include, but are not limited to, letters, invoices, purchase orders, bank statements, account statements, sales proposals, employment contracts, loan documents, product sheets, service agreements, policies, customer correspondences, transactional documents, legal documents, and so on.

As discussed above, CCM encompasses various IT components. These can include data extraction, transform, and load (ETL) software, data management, analysis, and location intelligence software, data composition software, print and post processing software, mailing compliance database software, printer management software, high volume production printers, envelope inserter machines, email marketing software, SMS communication software, mobile media and content distribution software, document production reporting software, portal software, etc. Aspects of an example of a document architecture that supports CCM on a single platform can be found in U.S. Patent Application Publication Nos. US 2017/0344547 A1, US 2017/0344526 A1, and US 2017/0346828 A1, which are incorporated by reference herein.

An object of the invention is to provide innovations and improvements in CCM. In some embodiments, this object is realized by augmenting the document architecture with a user experience (UX) application particularly configured for CCM communication flow modeling. The CCM communication flow modeling UX application is configured for non-technical users. Examples of non-technical users can include decision makers who are not familiar with IT in general, but who direct how a communication should flow from creation to delivery and actions to be taken in-between. A system implementing the CCM communication flow modeling UX application disclosed herein is very user friendly and shields all the complicated CCM communication flow processing and behind-the-scene execution logics from its frontend users.

In some embodiments, at design time, the system can receive, from a user device through a launch page, an instruction from a user to open or create a communication flow modeling project. In some embodiments, the launch page can be implemented as a web based user interface that runs in a browser on the user's device.

In some embodiments, the user device can be communicatively connected to the system over a network. The instruction from the user can include a reference to a configuration for a drag-and-drop communication flow modeling environment provided by the CCM communication flow modeling UX application. The configuration for the drag-and-drop communication flow modeling environment contains particular elements (e.g., orchestration server settings) for composing a communication flow model. The elements work with the CCM communication flow modeling UX application to allow a user to create a communication flow model in a visual way that consumes those orchestration server settings. These elements are associated with a user group or persona. That is, the configuration for the drag-and-drop communication flow modeling environment is customized for the user based on, for instance, the user's association with an enterprise. In some embodiments, the enterprise can be a tenant of the system. In such cases, the configuration for the drag-and-drop communication flow modeling environment can be specific to the tenant and different from another configuration for the drag-and-drop communication flow modeling environment for another tenant of the system.

In some embodiments, the configuration for the drag-and-drop communication flow modeling environment dictates what modeling entities are available through the drag-and-drop communication flow modeling environment. The modeling entities can include input entities, output entities, switch entities, and action entities. In some embodiments, the input entities can represent input connectors for a plurality of input data sources. The plurality of input data sources can include, but are not limited to, a HyperText Transfer Protocol (HTTP) port, an input folder, a mobile application, or a service. In some embodiments, the action entities can represent actions that can be taken by the switch entities. In some embodiments, the actions can include, but are not limited to, at least one of document composition, document generation, document indexing, document printing, conversation, cloud delivery, email delivery, mail dispatch, text message, report generation, or file storage.

In some embodiments, the system can provide the user with the drag-and-drop communication flow modeling environment through the CCM communication flow modeling UX application (which is a server-hosted application and which can also be referred to herein as an orchestration flow modeling application) running on the user device. The drag-and-drop communication flow modeling environment can have a communication flow modeling canvas and a menu of the modeling entities identified for the user per the user's association with a tenant of the system. The user models a communication flow using the tenant-specific modeling entities on the communication flow modeling canvas. The communication flow modeling canvas can be configured for interacting with the user and for creating and/or modifying the communication flow model in a draft state responsive to the user dragging a set of modeling entities from the menu, dropping the set of modeling entities onto the communication flow modeling canvas, and relating the set of modeling entities to form and/or edit the communication flow model.

Once the user completes modeling the communication flow, the user can indicate to the system that the communication flow is ready for review and approval. At this time, the communication flow is in a review state. A communication flow reviewer can review the communication flow and either approve or reject the communication flow. If rejected, the communication flow is returned to the draft state and the user can either rework or discard the communication flow. If approved, the communication flow is placed in an approved state.

Once the communication flow is approved, it is active and ready for execution by an orchestration server running on a document architecture at the backend of an enterprise computing environment. The enterprise computing environment implementing the document architecture can be separate and independent of enterprise tenants that utilize the document architecture. Each enterprise tenant can have its own enterprise computing environment.

In some embodiments, the communication flow is stored as a resource in a central repository. When data comes into the system through an input connector, the system checks the central repository for all active communication flows, selects the communication flow(s) that match(es) the input connector, and execute the selected communication flow(s) to process the incoming data, produce necessary document(s), and make appropriate delivery/deliveries accordingly.

In some embodiments, the central repository stores a communication flow configuration file for each active communication flow. In some embodiments, the communication flow configuration file can comprise an Extensible Markup Language (XML) file. In some embodiments, the communication flow configuration file can be implemented as an object, a package, or any suitable setup or arrangement. The communication flow configuration file can be viewed as an abstract file or an XML representation that could be deployed to and stored in the central repository.

In some embodiments, the central repository is accessible by the orchestration server operating on the document architecture at the backend of the enterprise computing environment. Operations of the orchestration server are transparent to users of the CCM communication flow modeling UX application. The orchestration server can be configured for executing the communication flow configuration file and, at runtime of the communication flow configuration file, orchestrate services provided by the document architecture in accordance with the communication flow configuration file to automatically implement the communication flow modeled by the user in the drag-and-drop communication flow modeling environment provided by the CCM communication flow modeling UX application.

One embodiment comprises a system comprising a processor and a non-transitory computer-readable storage medium that stores computer instructions translatable by the processor to perform a method substantially as described herein. Another embodiment comprises a computer program product having a non-transitory computer-readable storage medium that stores computer instructions translatable by a processor to perform a method substantially as described herein. Numerous other embodiments are also possible.

These, and other, aspects of the disclosure will be better appreciated and understood when considered in conjunction with the following description and the accompanying drawings. It should be understood, however, that the following description, while indicating various embodiments of the disclosure and numerous specific details thereof, is given by way of illustration and not of limitation. Many substitutions, modifications, additions, and/or rearrangements may be made within the scope of the disclosure without departing from the spirit thereof, and the disclosure includes all such substitutions, modifications, additions and/or rearrangements.

BRIEF DESCRIPTION OF THE DRAWINGS

The drawings accompanying and forming part of this specification are included to depict certain aspects of the invention. A clearer impression of the invention, and of the components and operation of systems provided with the invention, will become more readily apparent by referring to the exemplary, and therefore non-limiting, embodiments illustrated in the drawings, wherein identical reference numerals designate the same components. Note that the features illustrated in the drawings are not necessarily drawn to scale.

DETAILED DESCRIPTION

Figure 1:
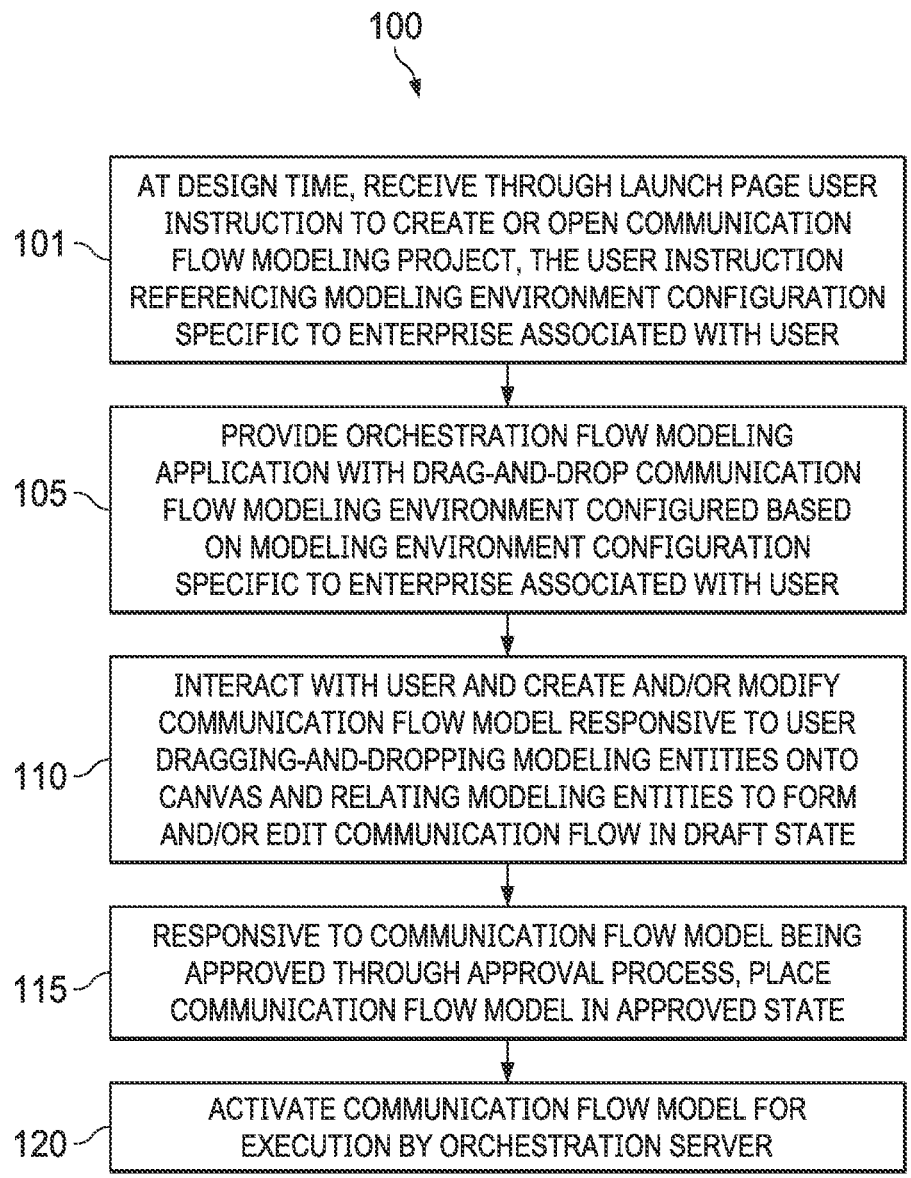
FIG. 1 is a flow chart illustrating an example of a method for communication flow modeling at design time according to some embodiments.

The invention and the various features and advantageous details thereof are explained more fully with reference to the non-limiting embodiments that are illustrated in the accompanying drawings and detailed in the following description. Descriptions of well-known starting materials, processing techniques, components, and equipment are omitted so as not to unnecessarily obscure the invention in detail. It should be understood, however, that the detailed description and the specific examples, while indicating some embodiments of the invention, are given by way of illustration only and not by way of limitation. Various substitutions, modifications, additions, and/or rearrangements within the spirit and/or scope of the underlying inventive concept will become apparent to those skilled in the art from this disclosure.

As described above, a document architecture can support CCM on a single platform. The document architecture utilizes document fragments to construct documents of different versions. The versions can include different software (e.g., content server) platform-specific versions, user-based role versions, different contextual versions, etc. In one aspect, the entire set of document versions may represent a genus of the document and each version a species of the genus. The document architecture utilizes reusable document fragments to construct the different portions of the documents. The document architecture need not save each document, as a whole (e.g., a Word document, a Portable Document Format (PDF) file, a spreadsheet file, a presentation file, etc.), in storage. Instead, the document architecture can save a single instance of the document fragments (that make up a document) in storage. This has a technical effect of storing "documents" in a much more efficient manner than conventional document storage solutions. The document architecture can use a single instance of such a "document" to render versions of the document for output. The document architecture provides many advantages by representing a genus of documents using document fragments instead of the multitude of fully "assembled" document versions.

The document architecture can import a document, for instance, via an input connector, analyze the document to break it apart into pieces of data, apply rules to the pieces of data (e.g., metadata, headers, any designated parts, etc.) and persist them in an internal system format (referred to as "messages" or "normalized fragments") in a data storage device referred to herein as a message store. A CCM system implementing the document architecture disclosed has full control of messages stored in the message store.

The CCM system can further process the system-formatted messages to augment, extend, or otherwise refine them with additional information/instructions. The refined results (referred to as "formatted data" or "formatted fragments") can be checked for uniqueness and stored in another data storage device referred to as a document broker plus storage. As a result, only unique formatted fragments, and no duplicates, are stored in the document broker plus storage ready for use and reuse by downstream processes in the document architecture.

For example, fragments may be retrieved from the document broker plus storage for CCM post processing/formatting. This may involve assembling a document using the stored fragments based on instructions from a document definition associated with the document. After the document is assembled, the CCM system can invoke a driver/renderer to produce an output (e.g., a version of the document). A document may be rendered this way in different versions and in any desired format using the stored fragments. In this way, new communications may be generated from various combinations of fragments, in a new or different format than the original format of a document or documents from which fragments are used to generate the new communications.

The document architecture can be implemented as a microservices architecture having a plurality of services that work together to provide intelligent and efficient document production, management, storage, and rendering. Microservices is a variant of the service-oriented architecture (SOA). In a microservices architecture, services are fine-grained and the protocols are lightweight. Each service is self-contained and autonomous.

The CCM system and the underlying document architecture are technically complicated and complex. Such technical complexities necessitate the need for highly skilled programmers and/or software developers to make these services work together for a certain purpose (e.g., an email campaign). What is needed is a way to extend the functionality of the CCM system to non-programmers or non-technical users so that even users with no technical background or programming knowledge can control how a communication flows through the CCM system, including what actions (proactive and/or reactive actions) that the CCM system is to take (e.g., what service to call, whether another version of the communication is to be generated, which communications channel(s) the communication is to be delivered, etc.).

In some embodiments, the need to shield users from technical complexities usually required in modeling communication flows can be addressed by augmenting the document architecture with an UX application particularly configured for CCM communication flow modeling. The CCM communication flow modeling UX application can extend the functionality of the CCM system to non-technical users and yet shield them from the technical complexities and complicated execution logics of the CCM system and the underlying document architecture. For example, at design time, a user can use the CCM communication flow modeling UX application to model a communication flow. At runtime, a new orchestration server can run the communication flow on the document architecture and make sure that the communication flow works as modeled by the user at design time. The orchestration server can be part of the CCM system. The CCM system can reside at the backend of an enterprise (private) network or hosted in the cloud.

Figure 2:
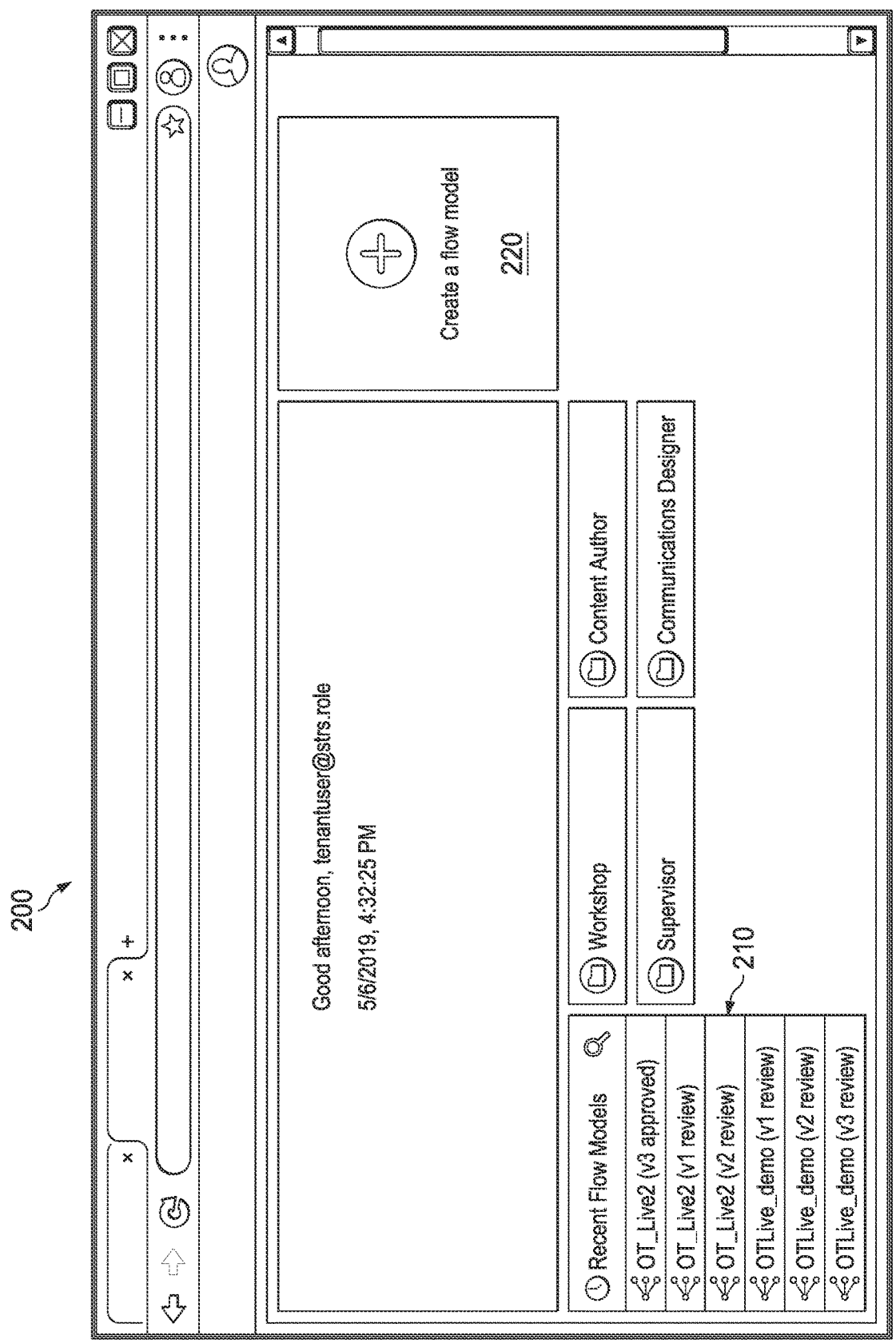
FIG. 2 depicts a diagrammatic representation of an example of a communication flow modeling launch page according to some embodiments.

FIG. 1 is a flow chart illustrating an example of a method for communication flow modeling at design time according to some embodiments. In some embodiments, at design time, a system can receive, from a user device through a launch page, an instruction from a user to open or create a communication flow modeling project (101). An example of a launch page 200 is shown in FIG. 2. In this example, launch page 200 is a web based user interface of an orchestration flow modeling UX application. The orchestration flow modeling UX application can be hosted, on the server side, by a CCM system implementing the document architecture described above.

In some embodiments, the user device can be communicatively connected to the system over a network. The instruction from the user can include a reference to a configuration for a drag-and-drop communication flow modeling environment. As discussed above, the configuration for the drag-and-drop communication flow modeling environment contains particular elements (e.g., orchestration server settings) for composing a communication flow model. The elements work with the orchestration flow modeling UX application to allow a user to create a communication flow model in a visual way that consumes those orchestration server settings. These elements are associated with a user group or persona. That is, the configuration for the drag-and-drop communication flow modeling environment is customized for the user based on, for instance, the user's association with an enterprise (which, for instance, can be a tenant of the system). In such cases, the configuration for the drag-and-drop communication flow modeling environment can be specific to the tenant such that modeling entities available through the drag-and-drop communication flow modeling environment are also specific to the tenant.

As shown in FIG. 2, the user may interact with launch page 200 (e.g., through menus 210, 220) to open an existing communication flow modeling project from file, create a new project from scratch, create a project using a project template, or open a project package for editing. The user interaction may trigger the launch of an orchestration flow modeling application. For example, responsive to the instruction from a user to open or create a communication flow modeling project, the CCM system may provide the user with a communication flow modeling environment through the orchestration flow modeling UX application that is particularly configured for drag-and-drop communication flow modeling (105). To this end, launch page 200 shown in FIG. 2 represents a non-limiting example of how to launch an orchestration flow modeling application disclosed herein. Skilled artisans appreciate that the orchestration flow modeling application can be launched in many different ways (e.g., through a user's dashboard or a home page).

Before describing how the orchestration flow modeling UX application can be configured with a drag-and-drop communication flow modeling environment specific for the user, a description of what a communication flow is may be helpful.

Figure 3A:
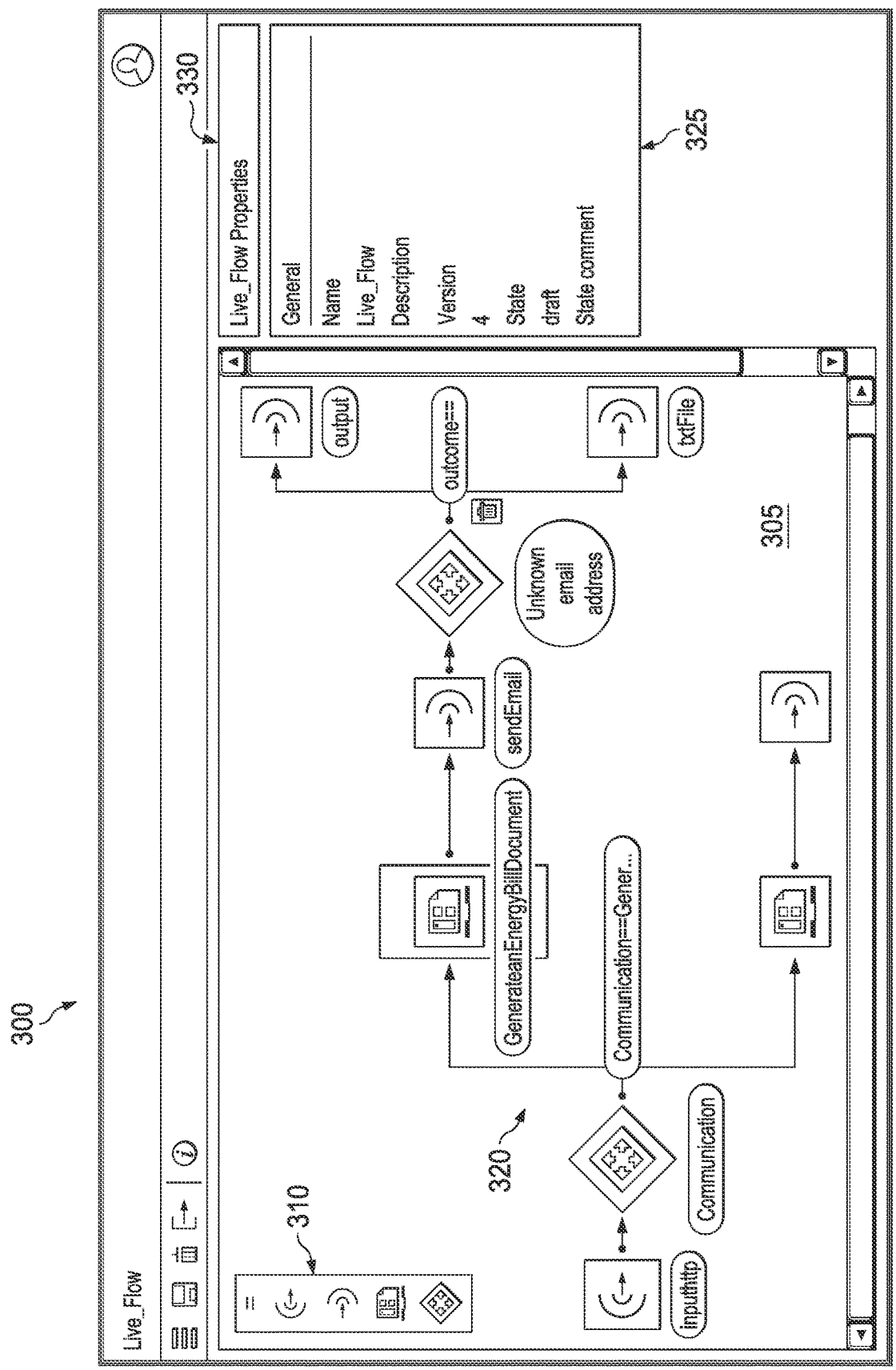
FIGS. 3A-3C together illustrate an example of a communication flow modeling process using an example of a user interface of a CCM communication flow modeling UX application disclosed herein according to some embodiments.

FIG. 3A depicts an example of a web based user interface (UI) 300 of an orchestration flow modeling UX application. In this example, UI 300 shows a communication flow 320 modeled using modeling entities from a modeling entity menu 310.

As a non-limiting example, communication flow 320 defines how input data from a data source is to be composed (e.g., from fragments) as a type of communication (e.g., an energy bill, a newsletter, a promotional offering, etc.). The composed communication is sent to a preferred communications channel (e.g., an email channel). The communications channel can be implemented using a service of the underlying document architecture. For instance, an email channel can be implemented using an email service of the document architecture.

Communication flow 320 can further define what action(s) to take when delivery of the communication through the preferred communication channel succeeds or fails (e.g., when an email is opened, bounced, or not opened). For instance, when an email is bounced (e.g., a "send error" has occurred), communication flow 320 can be directed to an alternate communications channel (e.g., a print channel).

As before, the alternate communications channel can be implemented using a service of the underlying document architecture. For instance, the print channel can be implemented using a print/mail service of the document architecture.

The print/mail service may operate to generate (again from fragments) the communication in a print format or change the composed communication from the email format to the print format, print the communication in the correct format, and send the communication to a mail management component of the document architecture. Communication flow 320 may further specify that, when the email has not been opened by a recipient after a period of time, send a reminder notice to the recipient. As a further example, when the recipient is nonresponsive to the reminder notice, communication flow 320 can be directed to another communications channel (e.g., a mobile communications channel). The mobile communications channel can be implemented using a mobile application or mobile service of the document architecture. The mobile communications service may operate to send a message (e.g., a text message, a voicemail, etc.) to remind the recipient about the communication.

Referring to FIG. 1, the orchestration flow modeling UX application provided by the CCM system is operable to interact with the user so that the user can model a communication flow like communication flow 320 by dragging and dropping modeling entities (e.g., from modeling entity menu 310) onto a canvas (110). In some embodiments, the modeling entities can include input entities, output entities, switch entities, entities, and action entities. In some embodiments, the input entities can represent input connectors for a plurality of input data sources. The plurality of input data sources can include, but are not limited to, an HTTP port, an input folder, a mobile application, or a service. In some embodiments, the action entities can represent actions that can be taken by the switch entities. The actions can include, but are not limited to, at least one of document composition, document generation, document indexing, document printing, conversation, cloud delivery, email delivery, mail dispatch, text message, report generation, or file storage. Other types of modeling entities can also be presented. For example, in some embodiments, template entities or reusable entities can represent communication templates or reusable sub communication flows (explained below) that are specific to the enterprise associated with the user.

Figure 4:
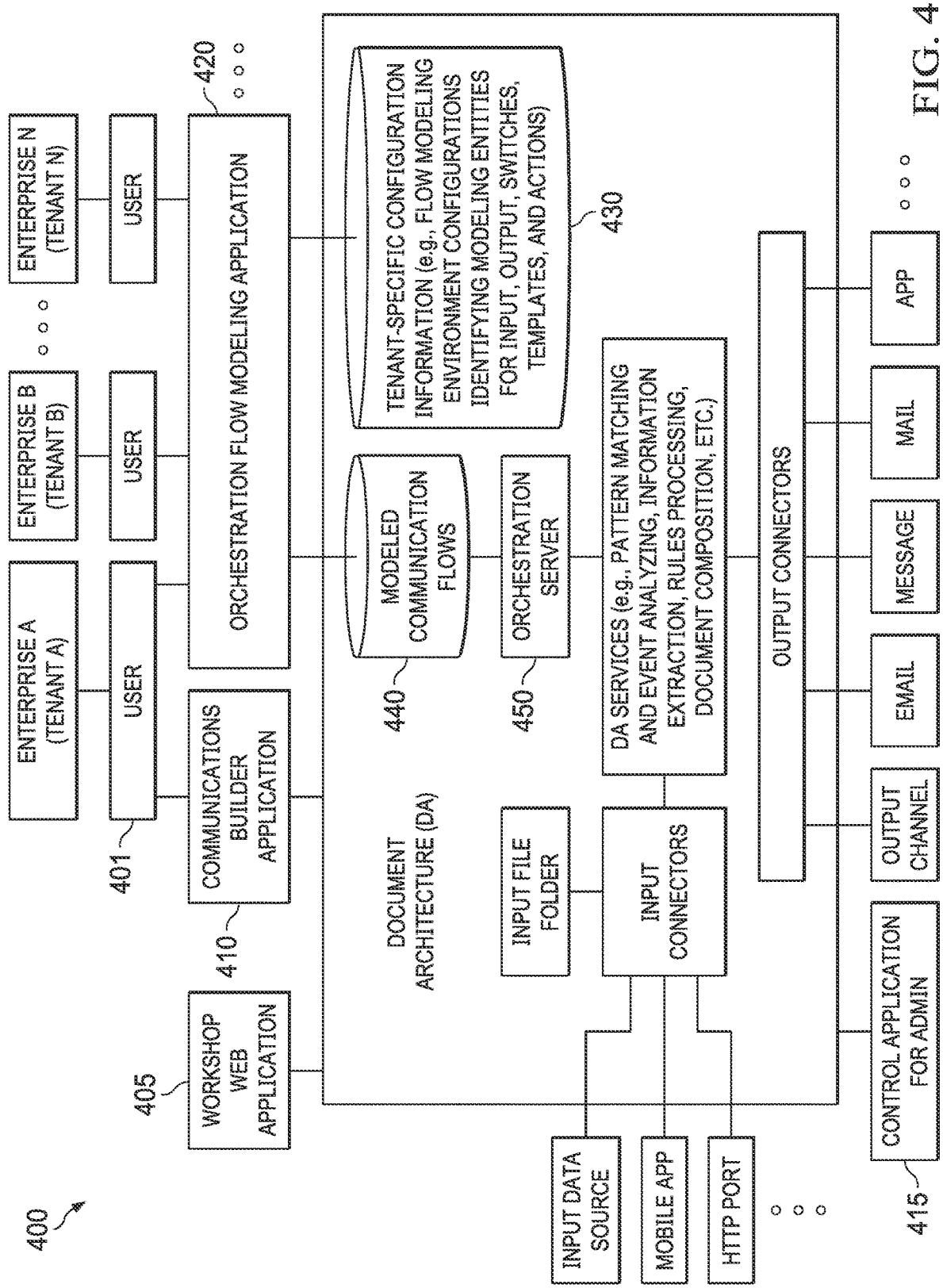
FIG. 4 depicts a diagrammatic representation of an example of system architecture for communication flow modeling in a networked computing environment according to some embodiments.

As discussed above, the specific kinds of modeling entities available for the user can depend on the configuration for the drag-and-drop communication flow modeling environment and the configuration can be based on the user's association with an enterprise. The enterprise can be an operator or a customer of the CCM system. For example, as illustrated in FIG. 4, enterprise A can be a tenant of a multitenancy platform on which CCM system 400 runs. Multiple tenants (e.g., enterprise A . . . enterprise N) of the multitenancy platform could utilize CCM system 400 (which is supported by the underlying document architecture) and each tenant would have a tenant-specific configuration for the drag-and-drop communication flow modeling environment. Accordingly, the drag-and-drop communication flow modeling environment can differ from tenant to tenant.

The user's association with the enterprise can be determined based on the user's role and/or credential. In the example of FIG. 4, when user 401 signs into CCM system 400 (e.g., through orchestration flow modeling application 420), CCM system 400 is operable to determine the user's association with one of its tenants and access data store 430 to retrieve tenant-specific configuration information. The tenant-specific configuration information is deterministic to what menu items would be available to the user through orchestration flow modeling application 420.

As discussed above, orchestration flow modeling application 420 is configured for non-technical users. To this end, an IT or policy administrator can set up a base configuration of technical features for communication flow modeling. As a non-limiting example, this can be done by selecting the "WorkShop" option on launch page 200 to launch workshop web application 405 in a browser running on the IT or policy administrator's device. Workshop web applications are web based configurations of channels and security profiles. There can be multiple communication flow modeling base configurations (per enterprise) for a user of orchestration flow modeling application 420 to choose from. Accordingly, the tenant-specific configuration information can include references to communication flow modeling base configurations that are specific to an enterprise with which the user is associated.

More advanced users such as developers or communications designers can use a communications builder application 410 to define/configure document services or communications services (e.g., more advanced processing routes such as rendering documents) that can connect to the backend services provided by the underlying document architecture. When a backend service is linked to a communication flow, a document service or communications service that is connected to the backend service is involved within the communication flow. As a non-limiting example, communications builder application 410 is a desktop application that can be launched through launch page 200 (e.g., by selecting the "Communications Designer" option on launch page 200).

As discussed above, orchestration flow modeling application 420 can also be launched through launch page 200 by selecting an existing flow model or creating a new one (as a project). As a non-limiting example, once a communication flow modeling project is opened or created, multiple communication flow modeling base configurations can be presented (e.g., as communications packages). The user can select a communications package (which, technically, is a reference to a tenant-specific communication flow modeling base configuration stored in a repository at the backend). In some embodiments, the communications package can be a communications builder project that has been built by an application developer or builder using a communications builder application (e.g., communications builder application 410) and enabled for use in an orchestration flow modeling application (e.g., orchestration flow modeling application 420). In some embodiments, the user is directly presented with a default communication flow modeling configuration and no user-selection of a communications package is necessary.

The communication flow modeling configuration (i.e., a selected or default communication package) defines what modeling entities should be included in a drag-and-drop communication flow modeling environment for the user within the orchestration flow modeling application (e.g., what input connectors are available for the orchestration flow modeling application, what output connectors are available for the orchestration flow modeling application, what communication templates and designs are available for the orchestration flow modeling application, and so on). These modeling entities are specific and inherent to the orchestration flow modeling application configured for the user. Once the user is presented with the drag-and-drop communication flow modeling environment, the user can start to model the communication flow through a canvas provided in the drag-and-drop communication flow modeling environment of the orchestration flow modeling application.

Figure 3B:
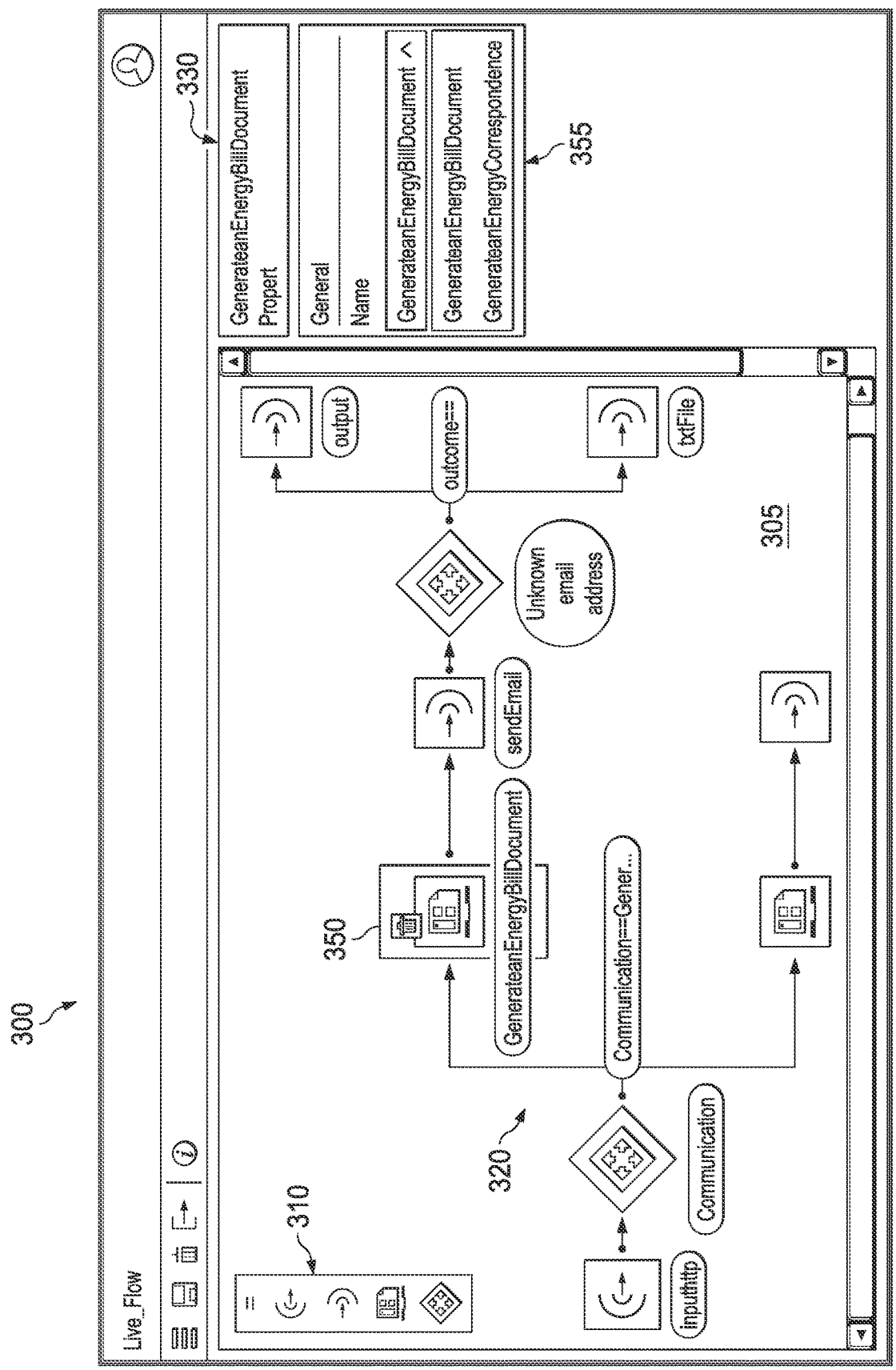
Figure 3C:
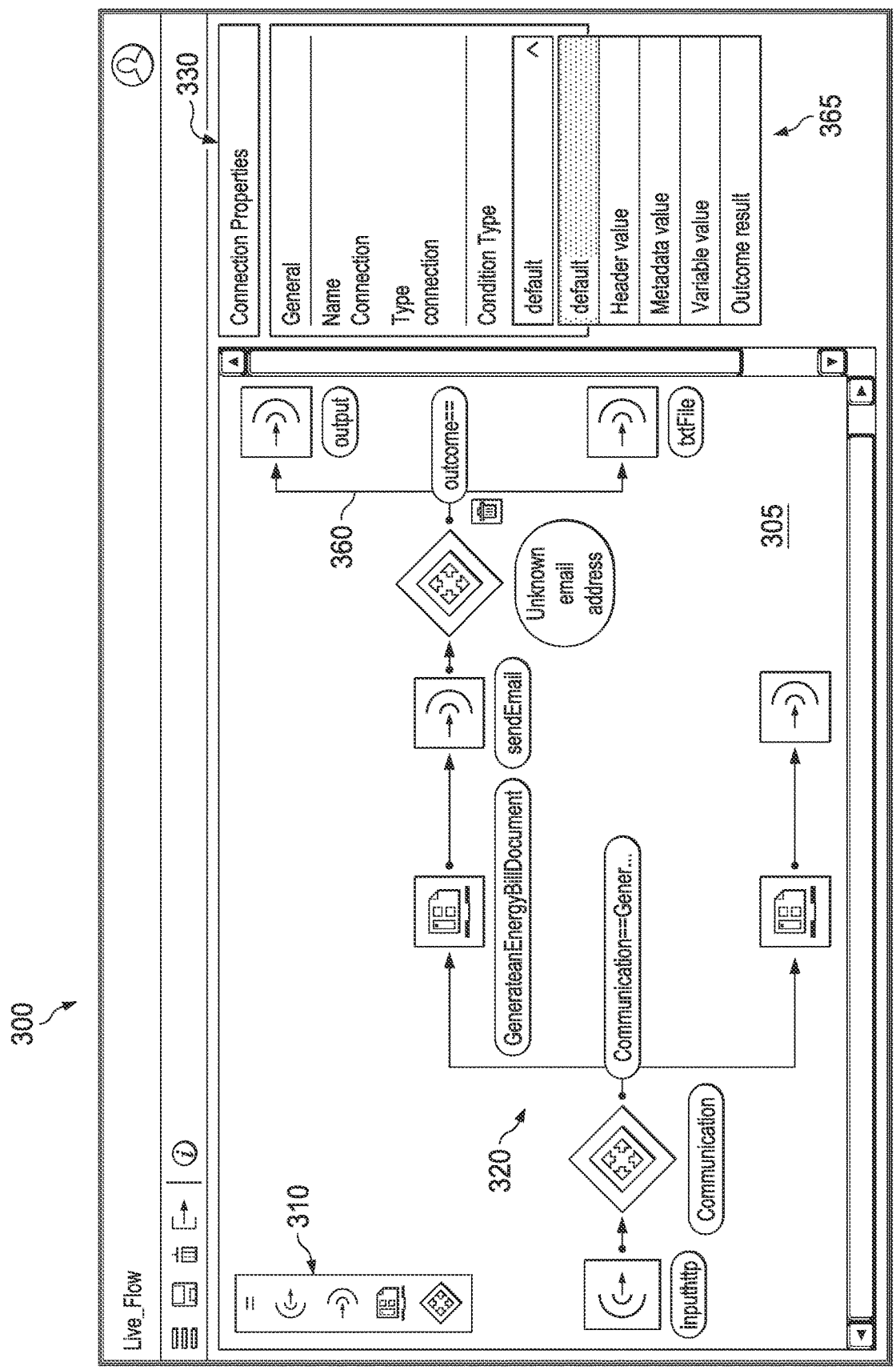

As illustrated in FIG. 4, orchestration flow modeling application 420 can run on a user device communicatively connected to CCM system 400 over a network. As discussed above and illustrated in FIG. 3A, the user can drag-and-drop modeling entities onto a canvas provided by the orchestration flow modeling application to model a communication flow (e.g., communication flow 320). In the example of FIGS. 3A-3C, the drag-and-drop communication flow modeling environment can have a communication flow modeling canvas 305 and a panel or menu 310 of available modeling entities configured for the user.

As a non-limiting example, panel or menu 310 shows, from top to bottom, modeling entities of input, output, event action or trigger, and switch (decider). Communication flow modeling canvas 305 can be configured for interacting with the user, including allowing the user dragging a set of modeling entities from menu 310, dropping the set of modeling entities onto communication flow modeling canvas 305, and connecting the set of modeling entities to form a communication flow 320, for instance, from an input connector, through a switch, through event actions, to output connectors, one of which leads to another switch, which leads to another decider, which is connected to two output connectors. For an output, the user can relate actions to delivery events (e.g., email bounce) to model further steps after output. As described below, although not shown, in some embodiments, available modeling entities can include a chat bot which enables bidirectional conversations in a CCM process. Such bidirectional conversations are a technical effect of the UX-driven approach to CCM communication flow modeling disclosed herein. In some embodiments, as the user dragging and dropping modeling entities onto communication flow modeling canvas 305, corresponding changes are directly stored in a database.

In the example of FIG. 3A, UI 300 shows a property menu 330 of communication flow 320. As illustrated in FIG. 3A, property menu 330 include general properties 325 for communication flow 320, including a name of communication flow 320, a description for communication flow 320, a version number for communication flow 320, and state information for communication flow 320. In this example, communication flow 320 is in a draft state.

To view and/or modify details of a modeling entity on communication flow modeling canvas 305, the user can select a modeling entity of interest. In turn, property menu 330 displays more entity-level details or available services 355 for the modeling entity of interest, as shown in FIG. 3B.

Similarly, to view and/or modify details of a connection, path, or relationship on communication flow modeling canvas 305, the user can select a connection of interest. In turn, property menu 330 displays more connection-level details or condition types 365 for the connection of interest, as shown in FIG. 3C.

Referring to FIG. 1, in some embodiments, the system can interact with the user through the communication flow modeling canvas of the orchestration flow modeling application running on the user's device and respond accordingly. This results in a communication flow that is modeled by the user and that is stored as a resource in a centralized resource repository at the backend. In some embodiments, the communication flow is persisted as the user interacts with the system. In some embodiments, the communication flow is persisted when the user completes the modeling process.

When the user is done modeling the communication flow, the user can indicate to the system that the communication flow is ready for review. The system, in turn, can mark the communication flow as in a review state add the communication flow to a review and approval process. In some embodiments, this can entail the system calling a review service to run a review process and/or an approval service to run an approval process. In some embodiments, a communication flow reviewer (e.g., a supervisor) can access the system (e.g., through launch page 200) to review all the communication flows that have been marked by the system for review and approval or that have been placed in a review and approval process.

The communication flow reviewer can reject or approve the communication flow modeled by the user. If rejected, the communication flow is marked as in a rejected state. A rejected communication flow can be discarded or modified by the user and resubmitted for review and approval. If approved, the communication flow is marked as in an approved state (115).

Once the communication flow is the approved state, it is ready for activation and execution by an orchestration server (120). This activation can include the system optionally checking and/or verifying the communication flow modeled by the user for technical errors that are not visible to the user and/or the reviewer (e.g., whether an infinite loop that appears to be logically connected exists in the communication flow, whether logic connecting the modeling entities is correct, whether any pre-defined modeling restriction is met, etc.). In some embodiments, the orchestration flow modeling application is configured (e.g., through a default configuration set up by the IT or administrator) to prevent the user from inadvertently connecting modeling entities that do not work together and/or that do not work together in a certain order (e.g., a mail action cannot be positioned before a print action, etc.). This activation also means that the input connection of the communication flow that receives data is active so that when data comes into a communications channel (e.g., by a directory scan, a service or REST request, etc.), the communication flow will be matched to the data through the input connection and executed by the orchestration server.

Once activated, the communication flow stored in the central repository is considered "published" and can be triggered by incoming data to produce output (e.g., a communication such as an invoice, a statement, a promotional offer, a message, an email, etc.) based on the configuration of the communication flow, as explained below. The data is bound to the input entities through the communication flow.

In some embodiments, the communication flow is stored as a resource such as a communication flow configuration file. In some embodiments, the communication flow configuration file can comprise an XML file. In some embodiments, the communication flow configuration file can be implemented as an object, a package, or any suitable setup or arrangement. The communication flow configuration file can be viewed as an abstract file or an XML representation that could be deployed to and stored in the central repository. As a non-limiting example, the central repository can be implemented on a database.

Referring to FIG. 4, in some embodiments, the published communication flow modeled by the user is stored in database 440. Database 440 stores activated communication flows and is accessible by orchestration server 450. Monitoring and management of orchestration server 450 can be done through a control application 415 that is internal to the document architecture. Control application 415 can provide a web based UI for system administrators to manage runtime administration and monitor/supervise orchestration server 450 in executing communication flows, including reviewing a log file of orchestration server 450, starting or stopping orchestration server 450, creating instances of orchestration server 450 to execute activated communication flows, etc.

At runtime, when data comes into CCM system 400, orchestration server 450 is operable to load all the activated communication flows. Orchestration server 450 is operable to receive data through input connectors corresponding to various communications channels. Some communications channels are defined for communicating only a certain type of files (e.g., HTML files, PDF files, emails, etc.). Suppose an input connector receives a PDF file through a communications channel (i.e., the input channel). Orchestration server 450 may utilize a pattern matching service of the underlying document architecture to match the input type (e.g., PDF) from the input channel to the input connection(s) of activated communication flow(s). Orchestration server 450 can then select the ones that apply to the data coming in through the particular input channel. There can be more than one communication flows for an input channel. Thus, multiple communication flows could be used to process the input data. To this end, the input data can be considered what triggers the execution of an activated communication flow. This provides a technical effect of eliminating the need for a user to code or program the execution of an activated communication flow.

For each communication flow, orchestration server 450 is operable to execute a communication flow configuration file and orchestrate services provided by the document architecture in accordance with the communication flow configuration file. In this way, the user models the communication flow in the drag-and-drop communication flow modeling environment provided by orchestration flow modeling application 420 at design time and orchestration server 450 automatically implements the communication flow without requiring further input from the user at runtime.

This UX-driven approach shifts control of a communication flow from a technically skilled person (e.g., a programmer, a developer, etc.) to a CCM process decision maker (who would have a more efficient understanding, and perhaps more in-depth knowledge, of an enterprise's CCM processes). By enabling a CCM process decision maker to directly model a communication flow, which can then be automatically implemented by the CCM system, the UX-driven approach described above can also shorten the time needed to realize a communication flow (from design to review/approval to implementation). Further, because a CCM process decision maker models a communication flow in a drag-and-drop communication flow modeling environment, the CCM process decision maker is shielded from the technical complexities of the CCM system and the underlying document architecture. This allows the CCM process decision maker to focus on visually and graphically defining the communication flow and not be encumbered by complicated technical requirements, execution logics, and processes.

In some embodiments, the invention can operate at a higher abstraction layer and hide even more complicated modeling from non-technical users by allowing them to use sub communication flows. For instance, an assured email delivery can represent a portion of a communication flow that handles sending an email and what to do when that fails—resending the email or going to an assured printing delivery, etc. This portion of the communication flow can be given a name and encapsulated as a modeling entity (e.g., "assured printing"). When a user models another communication flow, the user can select "assured printing" as part of the communication flow without having to model the steps for "assured printing" specifically. The user can define a reusable sub communication flow or component (e.g., if email fails, do a fallback channel of print called the print-fallback-assured delivery, etc.) so the next time when the user creates a communication flow, the user can reuse the user-created component. These types of reusable sub communication flow can become common over time. Each such sub communication flow can be an encapsulated entity that can be made available (as an modeling entity through a sharing scheme such as public sharing, private sharing, enterprise-specific sharing, or user-group-specific sharing, etc.) to other non-technical users through the orchestration flow modeling application so that all the non-technical users can further avoid having to work on (e.g., create and/or modify) the more granular communication flows.

The orchestration flow modeling application is configured to enable a user such as a CCM process decision maker to model a CCM communication flow in many ways. Examples are illustrated in FIGS. 5A-7C. More specifically, FIGS. 5A-7C show how assured deliveries (e.g., via a print campaign, an email campaign, and an advanced email campaign) can be modeled by a non-technical user (e.g., a CCM process decision maker) in a user-friendly drag-and-drop communication flow modeling environment provided by the orchestration flow modeling application described above through a communication flow modeling canvas that does not involve programming or technical skills.

Figure 5A:
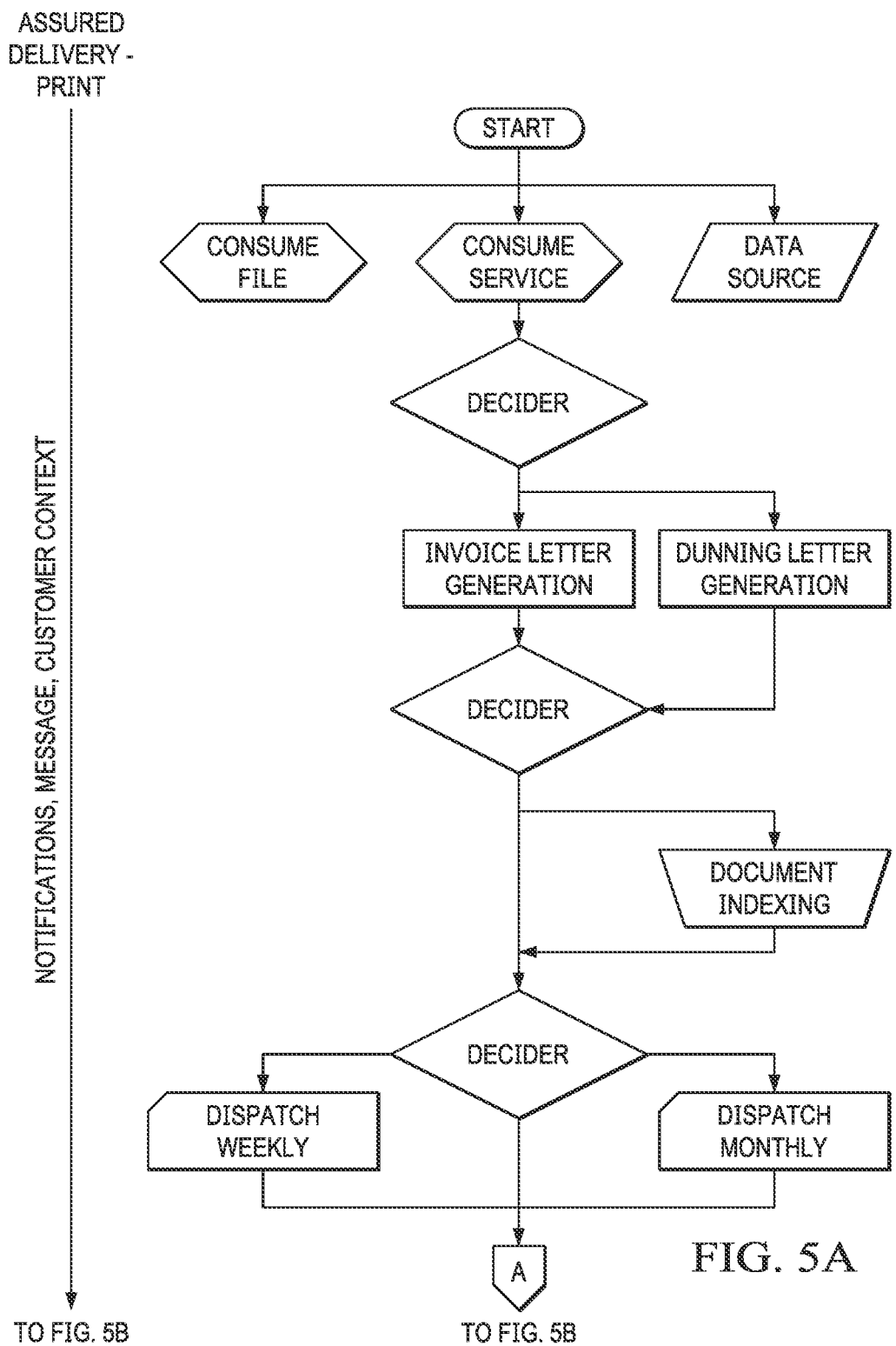
FIGS. 5A-5B show an example of a communication flow for assured delivery of print communications according to some embodiments.
Figure 5B:
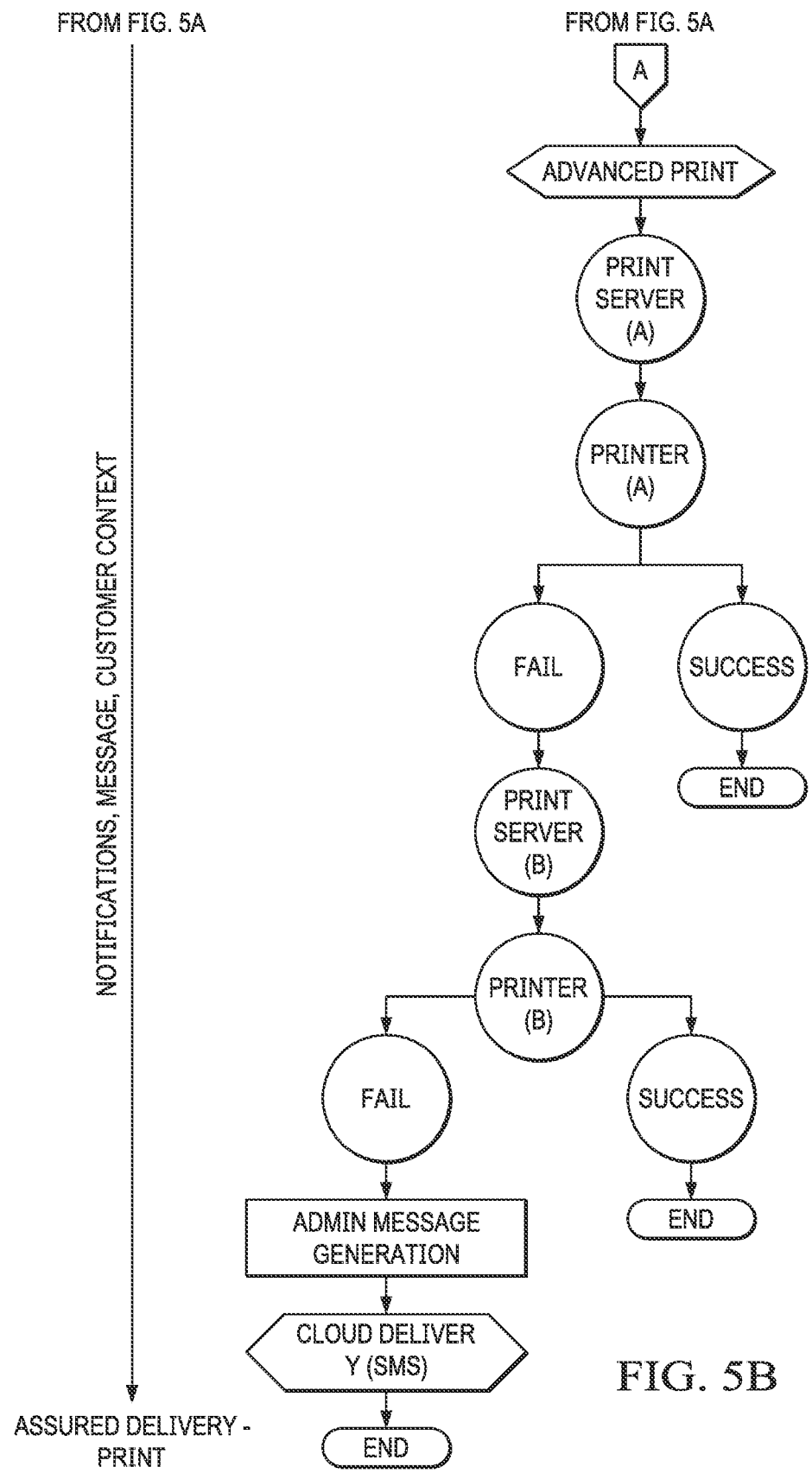
Figure 6A:
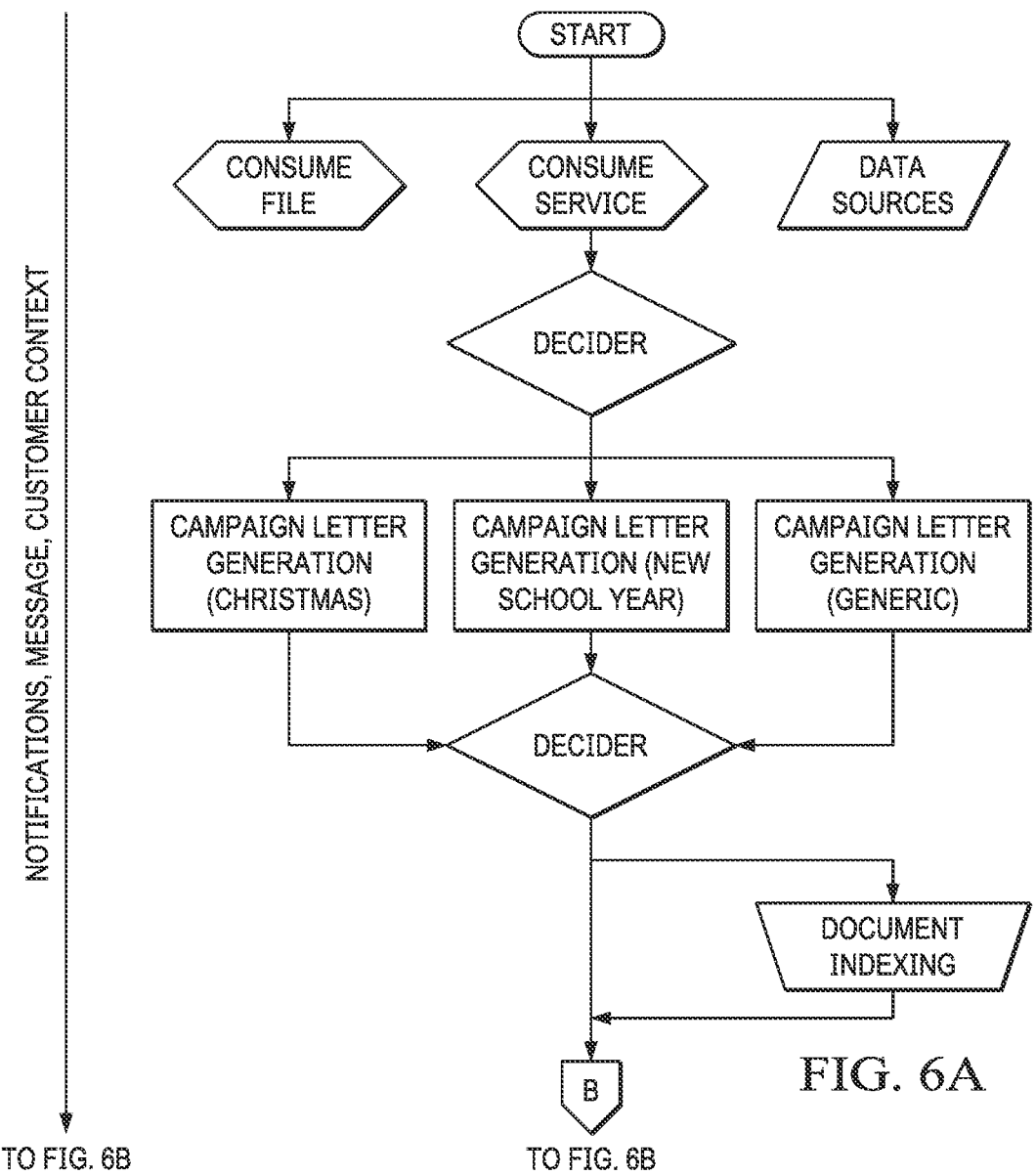
FIGS. 6A-6B show an example of a communication flow for assured delivery of email communications according to some embodiments.
Figure 6B:
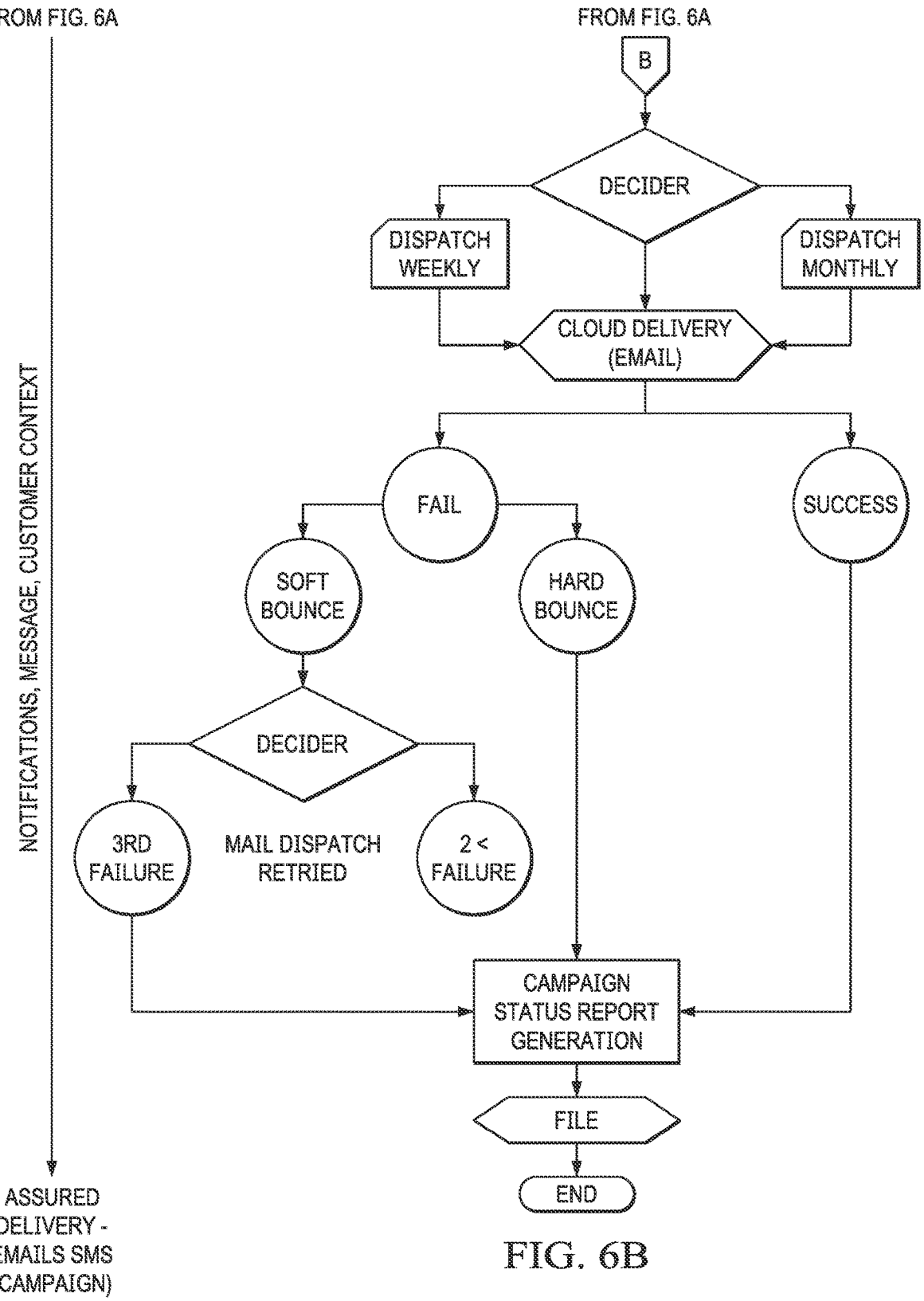
Figure 7A:
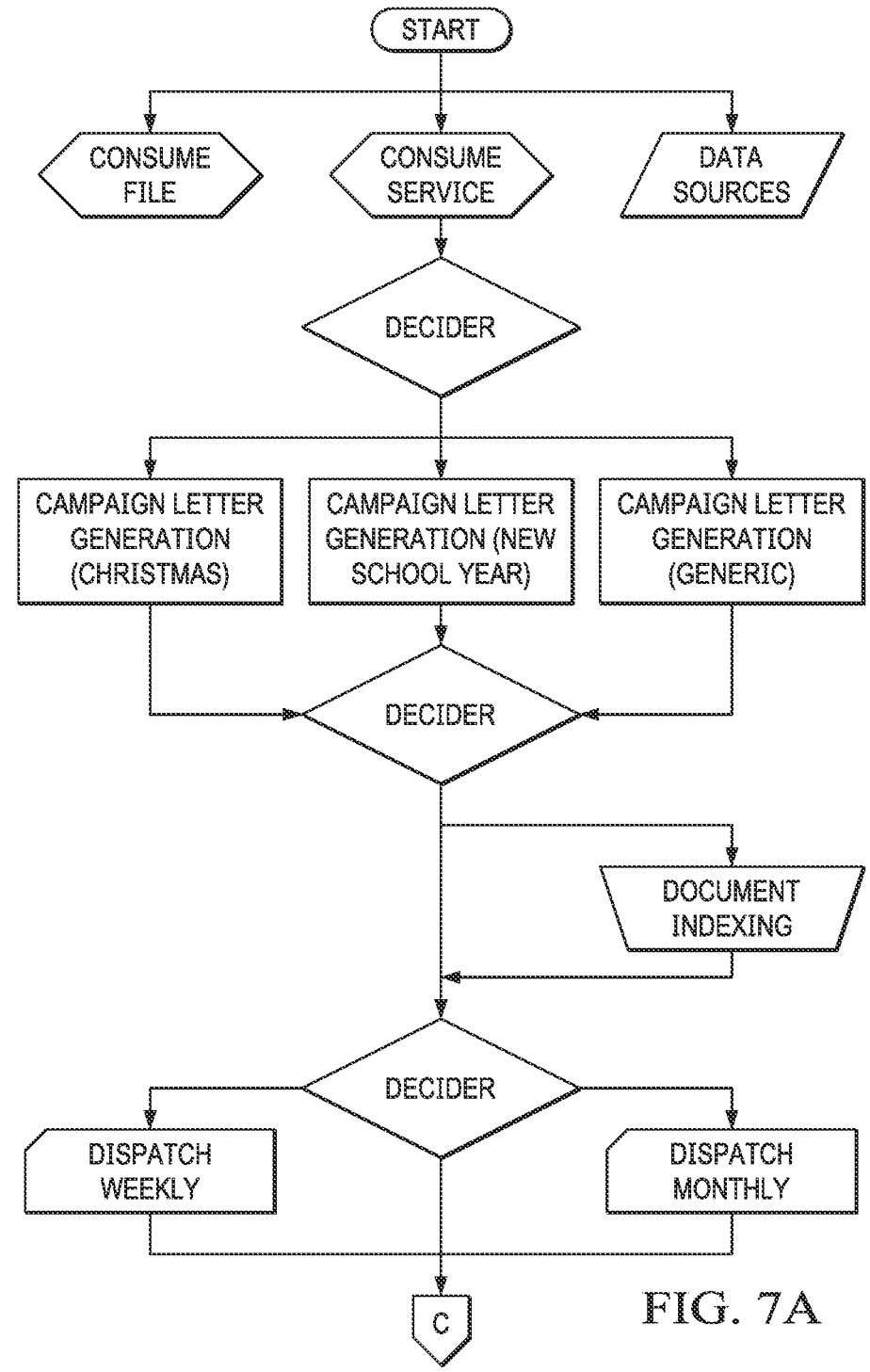
FIGS. 7A-7C show an example of a communication flow for advanced assured delivery of email communications according to some embodiments.
Figure 7B:
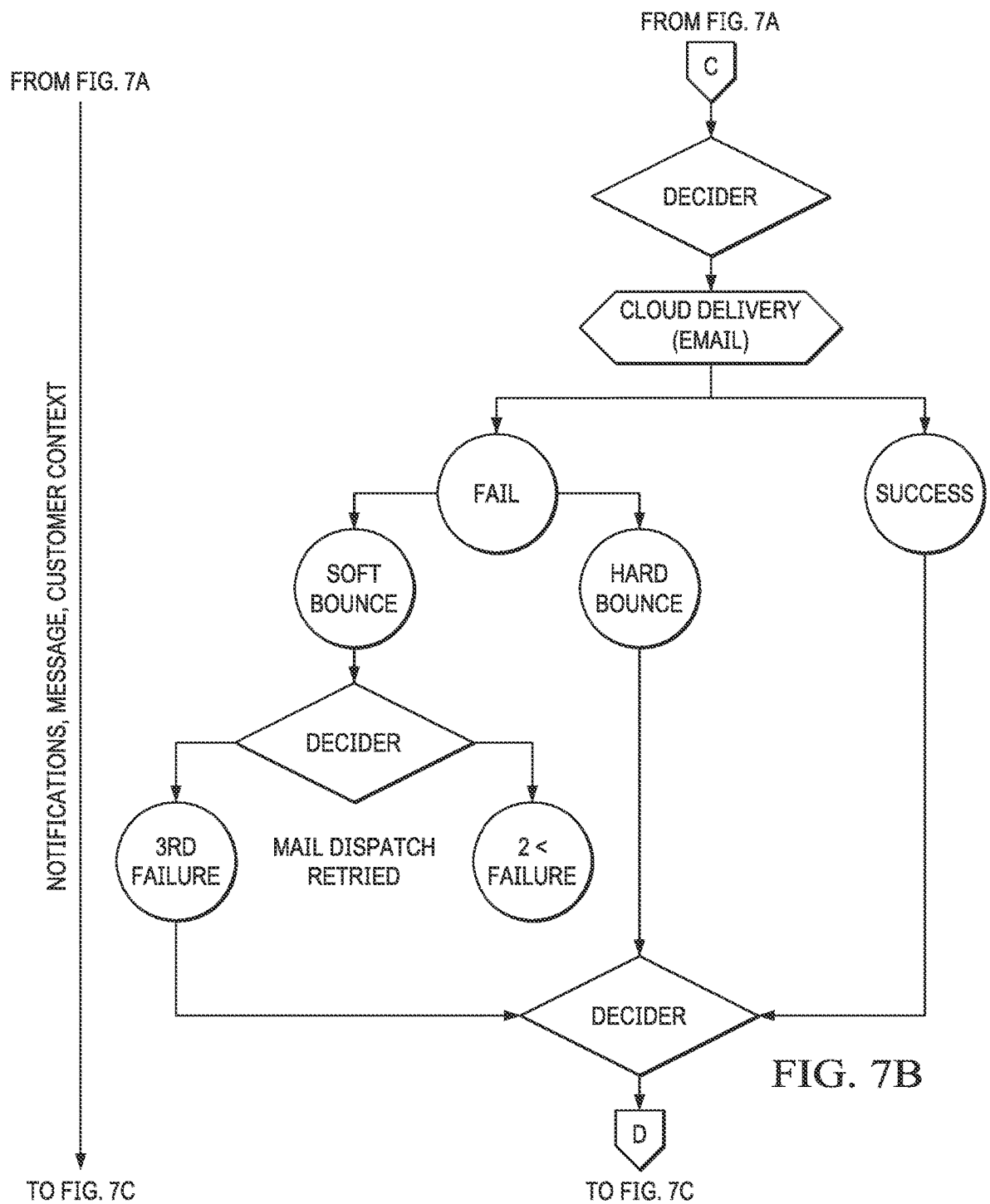
Figure 7C:
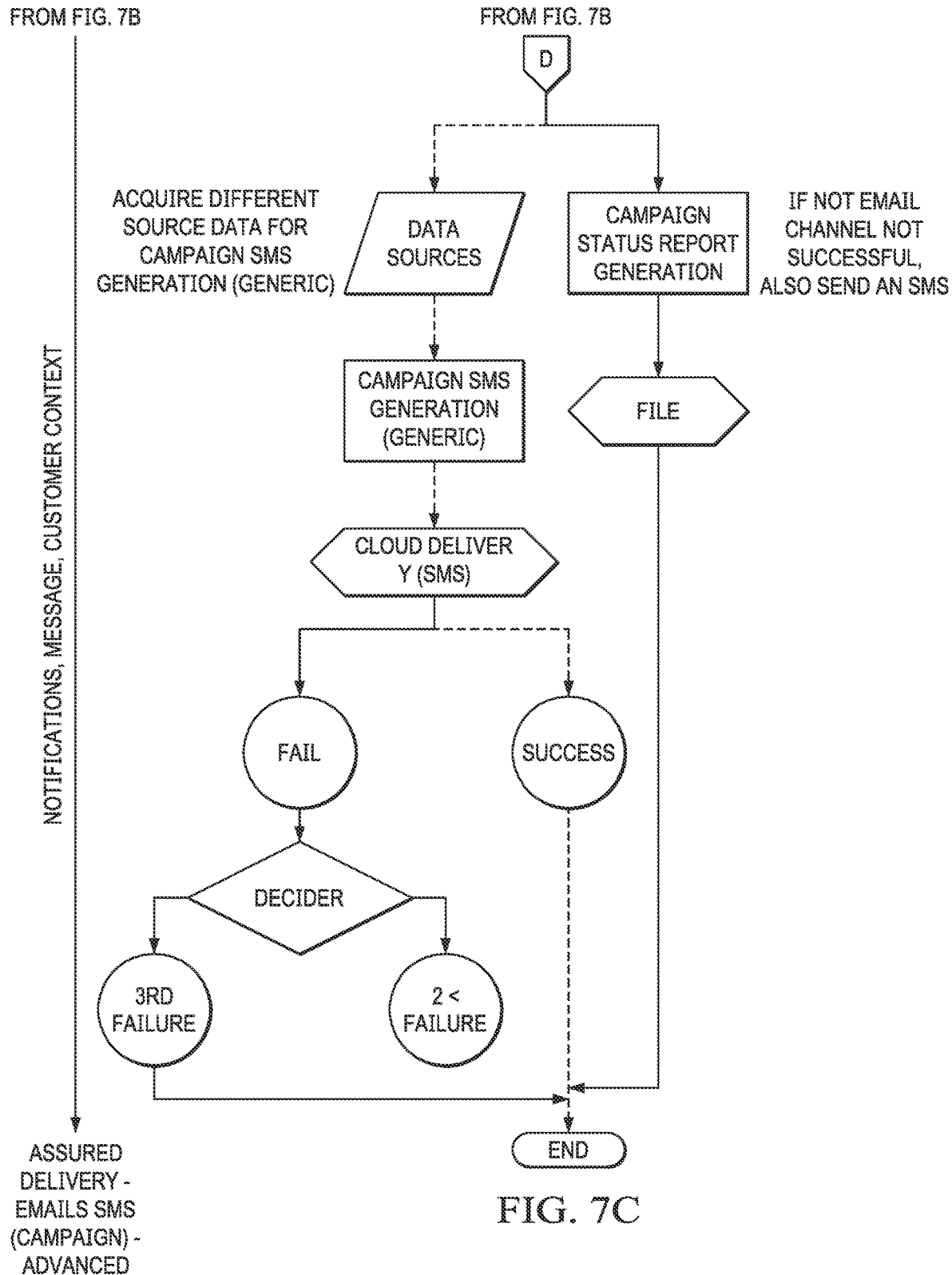

FIGS. 5A-5B show an instance of a communication flow that can be triggered by one of three input channels: a file-based channel, a service-based channel, and a data source element. At runtime, based on logic, a decider (which can also be referred to as a switch modeling entity in the drag-and-drop communication flow modeling environment) is operable to determine an appropriate document generation service (e.g., invoice letter generation). Another decider is operable to determine, based on logic, whether document indexing is needed. Based on logic for a recipient type, a decider is operable to determine how the communication (e.g., the invoice letter generated by the appropriate document generation service) is to be dispatched (e.g., monthly, weekly, or immediately).

In this case, the communication channel "advanced print" is selected and an attempt to print the communication (e.g., the invoice letter) is initiated. At this point, two outcomes are possible—the attempt can succeed or fail. For example, the attempt can be a success when "printer A" on print server A is available and it prints the communication. If so, the instance of this communication flow is completed. The attempt can be a failure when "printer A" on print server A is not available or not be able to print the communication. If so, the print job is directed to "printer B" on print server B. Again, there are two possible outcomes—the attempt to print can succeed or fail. When "printer B" on print server B is available and it prints the communication, the instance of this communication flow is completed. If not, an admin message service is executed, and a SMS message is composed, indicating that the communication could not be printed. The SMS message is dispatched to an administrator who can follow up on the printer malfunctions. Behind the scene, these runtime activities are orchestrated by the orchestration server (e.g., orchestration server 450) at the backend and are transparent to the user.

The orchestration server can be implemented as a new type of communication server application that utilizes the key concepts of the document architecture and that is configured for executing modeled communication flows. The orchestration flow modeling application is configured such that a user can only select objects (e.g., modeling entities) that have been defined upfront to work with each other components of the CCM system. This ensures, as a technical effect, that communication flows modeled using the orchestration flow modeling application are not arbitrary and can be executed or run by (or implemented on or deployed to the orchestration server if the user has the proper permission to do so).

Once a communication flow is activated, the orchestration server can get the configuration based on the communication flow model and begin to listen for input events per the input connection defined in the communication flow. For example, it will start up and it will start to listen to received input data (e.g., through an HTTP port) and as soon as someone (an ERP system, for example) sends an input file with data (or drops a file in an input folder or directory), it will fire off an input data event. The input connectors do not know what they are receiving. The ability is on the pattern matching and analyzing services provided by the underlying document architecture. The pattern matching and analyzing services are operable to identify the incoming data (e.g., an invoice, a statement, etc.) and start to extract relevant information (e.g., what information needs to be extracted from this type of input) so that the system understands not only the type of incoming data (e.g., XML), but also what it means (e.g., this is an order for a pizza, a bill for a telephone company, a contract, etc.).

The input data event is processed according to the communication flow. For instance, the communication flow may specify that the input data is to be composed into an email. In this case, the input data event will be directed to a compose email process. The communication flow may further specify that the composed email should be delivered to an email channel. Thus, the composed email is directed to an email server. The orchestration server will wait and see how many and how long the email attempt takes. For those that failed, it will start another composition process automatically to process those customer entities (emails) that failed, compose them in a different format (e.g., PDF) and deliver them through a different channel (e.g., a print server).

FIGS. 6A-7C show communication flow use cases for email campaign and advanced email campaign that can be modeled by a user at design time in the drag-and-drop communication flow modeling environment provided by the orchestration flow modeling application described above and orchestrated by the orchestration server at runtime using various services provide by the underlying document architecture. Coupling the modeled communication flow with a "decider" allows the runtime system to run a specific branch or parallel branches simultaneously based on information either coming from a communication or from some other steps in the communication flow. This creates a powerful tool for modeling a communication flow.

The use cases exemplified in FIGS. 5A-7C can readily be generalized for other channels. For instance, a communication flow can specify that, instead of sending a communication to a mail channel, send a text message first. Likewise, if an email fails, send a message which has a link to a statement tracked by the system. The system can track the statement to see if the statement was accessed. The same would work for modeling an email campaign for a new product launch or a new service. A user can model this flow in the communication flow modeling environment and visually/graphically define that if a customer opens the email, send them a follow up action and, after a certain time period, provide another email to follow up. Or, if the customer does not do anything (i.e., the customer is not replying to the email at all), do something else (e.g., send a text message through a mobile communications channel or initiate a chat). In the communication flow modeling environment, a user can define a communication flow so that if a message never reaches a recipient, then the system knows to try different channels and/or different media in the same communication flow and knows to fall back to the print channel if all else fails. The events can be captured by the system and used by the system to take appropriate action. The system does not just keep trying to deliver the same communication and/or try the same communication channel over and over again.

As described above, the underlying document architecture can provide a plurality of "containerized" microservices. In some embodiments, the orchestration flow modeling application can be configured (depending on the user's association with an enterprise and the enterprise's subscription of services provided by the document architecture) with modeling entities that leverage these microservices.

For example, the orchestration flow modeling application can be configured with a "chat bot" modeling entity that leverages a chat service or chat bot function provided. That is, the same paradigm (e.g., relating input data to output actions/events to template selection) can be adapted to capture an incoming message from a customer of an enterprise. The customer may be texting the enterprise through their corporate mobile application, for example. At design time, a user can set the route on the incoming message to identify the "caller" (or the text message sender) and extract and analyze (e.g., through an extraction and analysis service or services) the incoming message. Suppose the message indicates that the customer wants to get a copy of their latest invoice or statement. The communication flow can be modeled to dynamically change the direction of the flow depending upon the content of the incoming message and direct (or redirect) a response back to the customer (e.g., through a message generation service and an SMS service). The response may include question(s) to the customer (e.g., to request more details on what they want to get through their communication).

Another use case can be, for instance, for claims processing where a claimant or claim processor can fill in details (e.g., of an insurance claim) by chatting online with a chat bot and the chat bot is defined for use in this environment. The orchestration flow modeling application enables a user to graphically and visually define a communication flow with a chat conversation that can also capture all types of communications (e.g., printed communications, page-based communications, paper-based communications, etc.) and dynamically distributed across multiple channels such as email (e.g., as a PDF attachment), print (e.g., letter mail), on-demand over HTML (e.g., as a web page), mobile device (e.g., via a push notification, a text message, or a mobile application), etc.

The user can define (e.g., by overlaying a sequence of dependent communication activities and make the chat bot as part of a general conversation. This means that the user can build a communication flow to include a chat bot and/or have the conversation be driven by an end user's interaction with the chat bot, leveraging the capability of CCM. For instance, an end user can interact with a financial statement and starts a chat/conversation with a CCM server. For example, the end user can ask a question and the system can respond automatically, based on how the communication flow was modeled. This can result in a tailored communication (e.g., getting a monthly financial statement or submitting an insurance claim) between the system and the end user based on the end user answering a question defined in the communication flow (e.g., an insurance claim process flow in this example).

The kind of flexibility and versatility of the system disclosed herein enables a user of the orchestration flow modeling application to model dynamic flows and relate input events to template selection to channel selection and follow up actions (e.g., delivery on the secondary channel if the primary channel fails). It also enables the user to "orchestrate" chat conversations that combine message-driven, automated chat conversations with multi-channel document interaction and communications. When implemented with tracking and analytics services provided by a CCM system implementing the underlying document architecture, the system can track the interaction between a communication and its recipient (e.g., what a recipient did or did not do with the communication). For example, the system can track if a recipient opened an email and clicked on the attachment or if the email bounced. This way, changes and/or responses can be applied and the communication flow can be dynamically re-modeled based on tracking results (e.g., re-marketing based on email response). The UX-driven communication flow modeling approach described above uniquely combines a traditional CCM for document generation (or document production) and the controls over such rich communications with new emerging channels of controlling text flows in messaging systems such as building a chat bot into one omni-channel communication solution capable of reacting to how end users interact with all those communication events.

The orchestration server works behind the scene to coordinate the execution of the configuration details from the orchestration flow modeling application and becomes what it needs to be in order to realize the communication flow that a user has modeled (based on the configuration that's created by user dragging and dropping flow modeling elements onto a canvas of a UI of the orchestration flow modeling application). For example, the orchestration server can become an assured delivery server for email campaigns or it could become an insurance claim chat bot. In a way, a modeled communication flow provides the orchestration server with a user-configured map showing the orchestration server how to orchestrate services (which can be hosted in the cloud or on premises) provided by the document architecture.

In some embodiments, the orchestration flow modeling application can be implemented as a thin client of the CCM system running on the document architecture. In some embodiments, the orchestration flow modeling application can be implemented as a Web-based application that runs within a browser application on a client device communicatively connected to the CCM system over a network.

Figure 8:
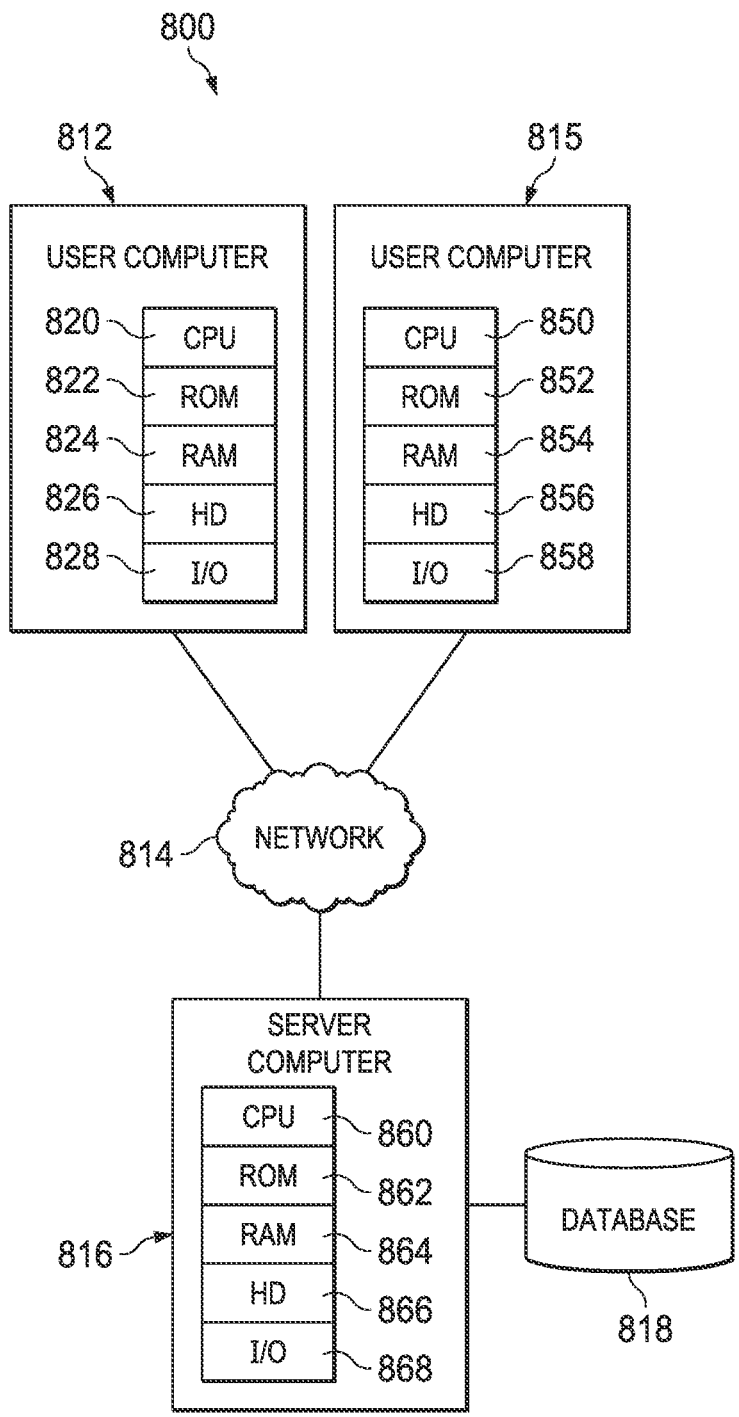
FIG. 8 depicts a diagrammatic representation of a distributed network computing environment where embodiments disclosed can be implemented.

FIG. 8 depicts a diagrammatic representation of a distributed network computing environment where embodiments disclosed can be implemented. In the example illustrated, network computing environment 800 includes network 814 that can be bi-directionally coupled to designer computer 812 and user computer 815. Network 814 may represent a combination of wired and wireless networks that network computing environment 800 may utilize for various types of network communications known to those skilled in the art.

For the purpose of illustration, a single system is shown for each of computer 812 and computer 815. However, with each of computer 812 and computer 815, a plurality of computers (not shown) may be interconnected to each other over network 814. For example, a plurality of computers 812 and a plurality of computers 815 may be coupled to network 814. Computers 812 may include data processing systems for CCM communication builders (or programmers). User computer 815 may include data processing systems for CCM process decision makers (or non-programmers).

Computer 812 can include central processing unit ("CPU") 820, read-only memory ("ROM") 822, random access memory ("RAM") 824, hard drive ("HD") or storage memory 826, and input/output device(s) ("I/O") 828. I/O 828 can include a keyboard, monitor, printer, electronic pointing device (e.g., mouse, trackball, stylus, etc.), or the like. Computer 812 can include a desktop computer, a laptop computer, a personal digital assistant, a cellular phone, or nearly any device capable of communicating over a network.

Computer 815 may be similar to computer 812 and can comprise CPU 850, ROM 852, RAM 854, HD 856, and I/O 858. Many other alternative configurations are possible and known to skilled artisans.

Each of the computers in FIG. 8 may have more than one CPU, ROM, RAM, HD, I/O, or other hardware components. For the sake of brevity, each computer is illustrated as having one of each of the hardware components, even if more than one is used. Each of computers 812 and 815 is an example of a data processing system. ROM 822 and 852; RAM 824 and 854; and HD 826 and 856; can include media that can be read by CPU 820 or 850. Therefore, these types of memories include non-transitory computer-readable storage media. These memories may be internal or external to computers 812 or 815.

Portions of the methods described herein may be implemented in suitable software code that may reside within ROM 822 or 852; RAM 824 or 854; or HD 826 or 856. In addition to those types of memories, the instructions in an embodiment disclosed herein may be contained on a data storage device with a different computer-readable storage medium, such as a hard disk. Alternatively, the instructions may be stored as software code elements on a data storage array, magnetic tape, floppy diskette, optical storage device, or other appropriate data processing system readable medium or storage device.

Those skilled in the relevant art will appreciate that the invention can be implemented or practiced with other computer system configurations, including without limitation multi-processor systems, network devices, mini-computers, mainframe computers, data processors, and the like. The invention can be embodied in a computer or data processor that is specifically programmed, configured, or constructed to perform the functions described in detail herein. The invention can also be employed in distributed computing environments, where tasks or modules are performed by remote processing devices, which are linked through a communications network such as a local area network (LAN), wide area network (WAN), and/or the Internet. In a distributed computing environment, program modules or subroutines may be located in both local and remote memory storage devices. These program modules or subroutines may, for example, be stored or distributed on computer-readable media, including magnetic and optically readable and removable computer discs, stored as firmware in chips, as well as distributed electronically over the Internet or over other networks (including wireless networks). Example chips may include Electrically Erasable Programmable Read-Only Memory (EEPROM) chips. Embodiments discussed herein can be implemented in suitable instructions that may reside on a non-transitory computer-readable medium, hardware circuitry or the like, or any combination and that may be translatable by one or more server machines. Examples of a non-transitory computer-readable medium are provided below in this disclosure.

ROM, RAM, and HD are computer memories for storing computer-executable instructions executable by the CPU or capable of being compiled or interpreted to be executable by the CPU. Suitable computer-executable instructions may reside on a computer-readable medium (e.g., ROM, RAM, and/or HD), hardware circuitry or the like, or any combination thereof. Within this disclosure, the term "computer-readable medium" is not limited to ROM, RAM, and HD and can include any type of data storage medium that can be read by a processor. Examples of computer-readable storage media can include, but are not limited to, volatile and non-volatile computer memories and storage devices such as random access memories, read-only memories, hard drives, data cartridges, direct access storage device arrays, magnetic tapes, floppy diskettes, flash memory drives, optical data storage devices, compact-disc read-only memories, and other appropriate computer memories and data storage devices. Thus, a computer-readable medium may refer to a data cartridge, a data backup magnetic tape, a floppy diskette, a flash memory drive, an optical data storage drive, a CD-ROM, ROM, RAM, HD, or the like.

The processes described herein may be implemented in suitable computer-executable instructions that may reside on a computer-readable medium (for example, a disk, CD-ROM, a memory, etc.). Alternatively, the computer-executable instructions may be stored as software code components on a direct access storage device array, magnetic tape, floppy diskette, optical storage device, or other appropriate computer-readable medium or storage device.

Any suitable programming language can be used to implement the routines, methods or programs of embodiments of the invention described herein, including C, C++, Java, JavaScript, HTML, or any other programming or scripting code, etc. Other software/hardware/network architectures may be used. For example, the functions of the disclosed embodiments may be implemented on one computer or shared/distributed among two or more computers in or across a network. Communications between computers implementing embodiments can be accomplished using any electronic, optical, radio frequency signals, or other suitable methods and tools of communication in compliance with known network protocols.

Different programming techniques can be employed such as procedural or object oriented. Any particular routine can execute on a single computer processing device or multiple computer processing devices, a single computer processor or multiple computer processors. Data may be stored in a single storage medium or distributed through multiple storage mediums, and may reside in a single database or multiple databases (or other data storage techniques). Although the steps, operations, or computations may be presented in a specific order, this order may be changed in different embodiments. In some embodiments, to the extent multiple steps are shown as sequential in this specification, some combination of such steps in alternative embodiments may be performed at the same time. The sequence of operations described herein can be interrupted, suspended, or otherwise controlled by another process, such as an operating system, kernel, etc. The routines can operate in an operating system environment or as stand-alone routines. Functions, routines, methods, steps and operations described herein can be performed in hardware, software, firmware or any combination thereof.

Embodiments described herein can be implemented in the form of control logic in software or hardware or a combination of both. The control logic may be stored in an information storage medium, such as a computer-readable medium, as a plurality of instructions adapted to direct an information processing device to perform a set of steps disclosed in the various embodiments. Based on the disclosure and teachings provided herein, a person of ordinary skill in the art will appreciate other ways and/or methods to implement the invention.

It is also within the spirit and scope of the invention to implement in software programming or code an of the steps, operations, methods, routines or portions thereof described herein, where such software programming or code can be stored in a computer-readable medium and can be operated on by a processor to permit a computer to perform any of the steps, operations, methods, routines or portions thereof described herein. The invention may be implemented by using software programming or code in one or more digital computers, by using application specific integrated circuits, programmable logic devices, field programmable gate arrays, optical, chemical, biological, quantum or nanoengineered systems, components and mechanisms may be used. In general, the functions of the invention can be implemented using any means as is known in the art. For example, distributed, or networked systems, components and circuits can be used. In another example, communication or transfer (or otherwise moving from one place to another) of data may be wired, wireless, or by any other means.

A "computer-readable medium" may be any medium that can contain, store, communicate, propagate, or transport the program for use by or in connection with the instruction execution system, apparatus, system or device. The computer-readable medium can be, by way of example only but not by limitation, an electronic, magnetic, optical, electromagnetic, infrared, or semiconductor system, apparatus, system, device, propagation medium, or computer memory. Such computer-readable medium shall generally be machine readable and include software programming or code that can be human readable (e.g., source code) or machine readable (e.g., object code). Examples of non-transitory computer-readable media can include random access memories, read-only memories, hard drives, data cartridges, magnetic tapes, floppy diskettes, flash memory drives, optical data storage devices, compact-disc read-only memories, and other appropriate computer memories and data storage devices. In an illustrative embodiment, some or all of the software components may reside on a single server computer or on any combination of separate server computers. As one skilled in the art can appreciate, a computer program product implementing an embodiment disclosed herein may comprise one or more non-transitory computer-readable media storing computer instructions translatable by one or more processors in a computing environment.

A "processor" includes any, hardware system, mechanism or component that processes data, signals or other information. A processor can include a system with a central processing unit, multiple processing units, dedicated circuitry for achieving functionality, or other systems. Processing need not be limited to a geographic location, or have temporal limitations. For example, a processor can perform its functions in "real-time," "offline," in a "batch mode," etc. Portions of processing can be performed at different times and at different locations, by different (or the same) processing systems.

As used herein, the terms "comprises," "comprising," "includes," "including," "has," "having," or any other variation thereof, are intended to cover a non-exclusive inclusion. For example, a process, product, article, or apparatus that comprises a list of elements is not necessarily limited only those elements but may include other elements not expressly listed or inherent to such process, product, article, or apparatus.

Furthermore, the term "or" as used herein is generally intended to mean "and/or" unless otherwise indicated. For example, a condition A or B is satisfied by any one of the following: A is true (or present) and B is false (or not present), A is false (or not present) and B is true (or present), and both A and B are true (or present). As used herein, a term preceded by "a" or "an" (and "the" when antecedent basis is "a" or "an") includes both singular and plural of such term, unless clearly indicated otherwise (i.e., that the reference "a" or "an" clearly indicates only the singular or only the plural).

Also, as used in the description herein, the meaning of "in" includes "in" and "on" unless the context clearly dictates otherwise.

It will also be appreciated that one or more of the elements depicted in the drawings/figures can also be implemented in a more separated or integrated manner, or even removed or rendered as inoperable in certain cases, as is useful in accordance with a particular application. Additionally, any signal arrows in the drawings/figures should be considered only as exemplary, and not limiting, unless otherwise specifically noted. The scope of the present disclosure should be determined by the following claims and their legal equivalents.

What is claimed is:

1. A customer communications management (CCM) system, comprising:
    a processor;
    a non-transitory computer-readable medium; and
    stored instructions translatable by the processor to perform:
        at design time, receiving, via a user interface of the CCM on a user device, an instruction from a user to open or create a communication flow modeling project, the instruction from the user referencing a configuration for a drag-and-drop communication flow modeling environment;
        in accordance with the configuration, providing the user with an orchestration flow modeling application on the user device, the orchestration flow modeling application having the drag-and-drop communication flow modeling environment, the drag-and-drop communication flow modeling environment having a communication flow modeling canvas and a menu of entity-specific modeling entities;
        responsive to the user dragging a set of entity-specific modeling entities from the menu, dropping the set of entity-specific modeling entities onto the communication flow modeling canvas, and drawing connections between the set of entity-specific modeling entities, logically connecting the set of entity-specific modeling entities to form a communication flow and storing the communication flow in a database in a draft state, wherein the communication flow undergoes a review and approval process;
        responsive to the communication flow being approved through the review and approval process, placing the communication flow in an approved state; and
        activating the communication flow for execution at runtime by an orchestration server operating on a document architecture, wherein, at runtime, the orchestration server loads the activated communication flow from the database, runs the communication flow on the document architecture, and orchestrates services provided by the document architecture in accordance with the communication flow as modeled by the user at design time without requiring input from the user at runtime.

2. The CCM system of claim 1, wherein the communication flow defines how input data from a data source is to be composed from fragments as a type of communication.

3. The CCM system of claim 2, wherein the communication flow further defines what action to take when delivery of the communication succeeds or fails.

4. The CCM system of claim 1, wherein the configuration for the drag-and-drop communication flow modeling environment contains elements for composing a communication flow model.

5. The CCM system of claim 4, wherein the elements are associated with a user group or persona.

6. The CCM system of claim 1, wherein the configuration for the drag-and-drop communication flow modeling environment is specific to a tenant such that the entity-specific modeling entities available through the drag-and-drop communication flow modeling environment are also specific to the tenant.

7. The CCM system of claim 1, wherein the set of entity-specific modeling entities comprises an input entity representing an input connector for an input data source.

8. A method, comprising:
at design time, receiving, from a user device by a customer communications management (CCM) system having a processor, an instruction from a user to open or create a communication flow modeling project, the instruction from the user referencing a configuration for a drag-and-drop communication flow modeling environment;
in accordance with the configuration, providing, by the CCM system, the user with an orchestration flow modeling application on the user device, the orchestration flow modeling application having the drag-and-drop communication flow modeling environment, the drag-and-drop communication flow modeling environment having a communication flow modeling canvas and a menu of entity-specific modeling entities;
responsive to the user dragging a set of entity-specific modeling entities from the menu, dropping the set of entity-specific modeling entities onto the communication flow modeling canvas, and drawing connections between the set of entity-specific modeling entities, logically connecting the set of entity-specific modeling entities to form a communication flow and storing the communication flow in a database in a draft state, wherein the communication flow undergoes a review and approval process;
responsive to the communication flow being approved through the review and approval process, placing the communication flow in an approved state; and
activating the communication flow for execution at runtime by an orchestration server operating on a document architecture, wherein, at runtime, the orchestration server loads the activated communication flow from the database, runs the communication flow on the document architecture, and orchestrates services provided by the document architecture in accordance with the communication flow as modeled by the user at design time without requiring input from the user at runtime.

9. The method according to claim 8, wherein the communication flow defines how input data from a data source is to be composed from fragments as a type of communication.

10. The method according to claim 9, wherein the communication flow further defines what action to take when delivery of the communication succeeds or fails.

11. The method according to claim 8, wherein the configuration for the drag-and-drop communication flow modeling environment contains elements for composing a communication flow model.

12. The method according to claim 11, wherein the elements are associated with a user group or persona.

13. The method according to claim 8, wherein the configuration for the drag-and-drop communication flow modeling environment is specific to a tenant such that the entity-specific modeling entities available through the drag-and-drop communication flow modeling environment are also specific to the tenant.

14. The method according to claim 8, wherein the set of entity-specific modeling entities comprises an input entity representing an input connector for an input data source.

15. The method according to claim 8, wherein the configuration for the drag-and-drop communication flow modeling environment is specific to a tenant such that the entity-specific modeling entities available through the drag-and-drop communication flow modeling environment are also specific to the tenant and wherein the set of entity-specific modeling entities comprises an input entity representing an input connector for an input data source.

16. A computer program product comprising a non-transitory computer-readable medium storing instructions translatable by a processor of a customer communications management (CCM) system to perform:
at design time, receiving, from a user device, an instruction from a user to open or create a communication flow modeling project, the instruction from the user referencing a configuration for a drag-and-drop communication flow modeling environment;
in accordance with the configuration, providing the user with an orchestration flow modeling application on the user device, the orchestration flow modeling application having the drag-and-drop communication flow modeling environment, the drag-and-drop communication flow modeling environment having a communication flow modeling canvas and a menu of entity-specific modeling entities;
responsive to the user dragging a set of entity-specific modeling entities from the menu, dropping the set of entity-specific modeling entities onto the communication flow modeling canvas, and drawing connections between the set of entity-specific modeling entities, logically connecting the set of entity-specific modeling entities to form a communication flow and storing the communication flow in a database in a draft state, wherein the communication flow undergoes a review and approval process;
responsive to the communication flow being approved through the review and approval process, placing the communication flow in an approved state; and
activating the communication flow for execution at runtime by an orchestration server operating on a document architecture, wherein, at runtime, the orchestration server loads the activated communication flow from the database, runs the communication flow on the document architecture, and orchestrates services provided by the document architecture in accordance with the communication flow as modeled by the user at design time without requiring input from the user at runtime.

17. The computer program product of claim 16, wherein the communication flow defines how input data from a data source is to be composed from fragments as a type of communication.

18. The computer program product of claim 17, wherein the communication flow further defines what action to take when delivery of the communication succeeds or fails.

19. The computer program product of claim 16, wherein the configuration for the drag-and-drop communication flow modeling environment contains elements for composing a communication flow model.

20. The computer program product of claim 19, wherein the elements are associated with a user group or persona.

* * * * *